United States Patent
Yamaguchi et al.

[11] Patent Number: 6,040,844
[45] Date of Patent: Mar. 21, 2000

[54] APPARATUS AND METHOD FOR STORING AND ACCESSING PICTURE GENERATION DATA

[75] Inventors: Yuji Yamaguchi; Masaharu Yoshimori; Hiroyuki Ozawa; Ryohei Iida, all of Tokyo; Kazuo Taniguchi, Kanagawa, all of Japan

[73] Assignee: Sony Corporation, Tokyo, Japan

[21] Appl. No.: 08/899,925

[22] Filed: Jul. 24, 1997

[30] Foreign Application Priority Data

Jul. 31, 1996 [JP] Japan ................................. 8-217774

[51] Int. Cl.⁷ ............................................. G06F 12/06
[52] U.S. Cl. ........................ 345/518; 345/511; 345/517; 345/521; 345/422; 345/430
[58] Field of Search .................................. 345/518, 507, 345/513, 430, 422, 515, 521; 711/149; 365/230.05, 189.05

[56] References Cited

U.S. PATENT DOCUMENTS

| | | | |
|---|---|---|---|
| 4,639,890 | 1/1987 | Heilveil et al. | 345/515 |
| 5,550,961 | 8/1996 | Chimoto | 345/433 |
| 5,694,560 | 12/1997 | Uya et al. | 345/518 |
| 5,706,481 | 1/1998 | Hannah et al. | 345/519 |
| 5,818,765 | 10/1998 | Taniguchi et al. | 365/189.05 |

*Primary Examiner*—Kee M. Tung
*Assistant Examiner*—Sy D. Luu
*Attorney, Agent, or Firm*—Fulwider Patton Lee & Utecht, LLP

[57] ABSTRACT

A system for mapping texture data at high speed with flexibility to different applications wherein texture data is sent to a memory interface (MEMIF) thorough a digital differential analyzer (DDA) and a texture mapping unit (TMAP) and loaded to free areas of a Z coordinatory memory (ZBUF) and a drawing data memory (FBUF). A Z coordinate value or drawing data is read/written through a bidirectional port. The TMAP converts texture coordinates into a physical address, reads texture data from dedicated read ports of the ZBUF and the FBUF with the physical address, and maps the texture data. Each of the ZBUF and the FBUF has a DRAM unit and an auxiliary memory. Data of one row of the DRAM unit can be sent to the auxiliary memory means at a time. When desired texture data is not present in the auxiliary memory, data of the entire row of the desired texture data is sent to the auxiliary memory and then read.

28 Claims, 22 Drawing Sheets

APPARATUS AND METHOD FOR STORING AND ACCESSING PICTURE GENERATION DATA

This application claims priority under the International Convention based upon Japanese Patent Application No. P08-217774, filed Jul. 31, 1996.

BACKGROUND OF THE INVENTION

1. Field of the Invention

The present invention relates to a new and improved picture generating system and, more particularly, to a method and apparatus for mapping texture data of three-dimensional computer graphics (3DCG) with a relatively inexpensive structure at high speed.

2. Description of the Related Art

In recent years, application fields for 3DCG systems have been expanding drastically. The 3DCG systems have been used not only for CAD systems, but also for cinemas, picture production, video games, and the like. Such 3DCG systems require the capabilities of not only displaying a three-dimensional shape of an object on a two-dimensional screen, but also providing a picture with a much higher degree of reality. As a technique for improving the expression of graphics, texture mapping techniques are known in the prior art. In such texture mapping techniques, a picture, a pattern, or the like is embedded for an object. The object is composed of a plurality of polygons such as a triangle or a square. The texture mapping is performed for each polygon units. In some 3DCG systems, the texture mapping technique is accomplished with hardware.

In the structure of a conventional picture generating apparatus, there is typically provided an interpolating unit (hereinafter, referred to as the DDA (Digital Differential Analyzer) that linearly interpolates a color value and a coordinate value. A texture memory unit (hereinafter, referred to as the TBUF unit) provides memory for texture data. A Z coordinate memory unit (hereinafter, referred to as the ZBUF unit) provides a memory for a Z coordinate value used for removing a hidden surface. A drawing data memory unit (hereinafter, referred to as the FBUF unit) provides a memory for drawing data. A texture mapping unit (hereinafter, referred to as the TMAP unit) converts texture coordinates corresponding to each drawing pixel obtained by the DDA unit into a physical address of the TBUF unit and maps the texture data. A memory interface unit (hereinafter, referred to as the MEMIF unit) that reads/writes a Z coordinate value from/to the ZBUF unit and reads/writes drawing data from/to the FBUF unit.

Also provided are a signal line for setting a parameter and for loading texture data, signal lines for sending data to the next stage, a signal line for sending display data to a display system, a bus for loading and reading texture data. A bus for reading/writing a Z coordinate value, and a bus for reading/writing drawing data.

In accordance with the operation of the above-described conventional picture generating apparatus, parameters necessary for linearly interpolating screen coordinates, a color value, and texture coordinates corresponding to a primitive such as a triangle are set to the DDA unit. The DDA unit linearly interpolates screen coordinates, a color value, and texture coordinates with such parameters so as to calculate screen coordinates, color value, and texture coordinates for each drawing pixel. The TMAP unit converts the texture coordinates obtained by the DDA unit into a physical address of the TBUF unit, reads the texture data from the TBUF unit, and maps the texture data for each drawing pixel.

The MEMIF unit typically reads a Z coordinate value stored in the ZBUF unit with (X, Y) coordinates of the drawing pixel of which the texture data has been mapped by the TMAP unit and compares the Z coordinate value with that of the drawing pixel. When they match, the MEMIF unit rewrites the Z coordinate value to the ZBUF unit. At this point, if necessary, the drawing data stored in the FBUF unit is read with the (X, Y) coordinates of the drawing pixel. The drawing data and the color value of the drawing pixel are logically operated. The resultant color value is written to the FBUF unit. When data is displayed, the MEMIF unit successively reads drawing data from the FBUF unit and sends the drawing data to the display system through the signal line D4.

In another conventional picture generating apparatus. In texture data maybe stored in free areas of a ZBUF unit that stores a Z coordinate value and an FBUF unit that stores drawing data. In addition, the TMAP unit that maps texture data of each drawing pixel includes a texture cache unit (hereinafter, referred to as the TCACHE unit) that stores a part of the texture data. A signal line is provided for sending texture data that has been read from the ZBUF unit and the FBUF unit to the TCACHE unit.

The operation of the aforedescribed second conventional picture generating apparatus is the same as the operation of the first conventional apparatus previously described except for the texture mapping operation.

In this regard, texture data is divided into a square area with the size corresponding to a TCACHE unit. Since the TCACHE unit is composed of an SRAM, the storage capacity thereof is relatively small. The texture data is stored in free areas of the ZBUF unit and the FBUF unit. When texture data corresponding to a drawing pixel is present in the TCACHE unit, the TMAP unit reads the texture data from the TCACHE unit and maps the texture data for the drawing pixel. When texture data corresponding to the drawing pixel is not present in the TCACHE unit, the TMAP unit successively reads square areas of the texture data from the ZBUF unit or the FBUF unit, loads the square areas to the TCACHE position, and then maps the texture data of the drawing pixel.

In a third conventional picture generating apparatus texture data is processed in parallel. A DDA unit linearly interpolates a color value and a coordinate value. TBUF units provide memories for texture data. ZBUF units provide memories for Z coordinate values used for removing a hidden surface. FBUF units provide memories for drawing data. TMAP units convert texture coordinates of each drawing pixel obtained by the DDA unit into physical addresses of the DDA units. MEMIF units read/write Z coordinate values from/to the ZBUF units and read/write drawing data from/to the FBUF units.

A signal line is provided for setting a parameter and loading texture data. Signal lines are also for sending data to the next stage. In addition there is a signal line for sending display data to the display system. Also provided are buses for loading and reading texture data, buses for reading/writing z coordinate values, and buses for reading/writing drawing data.

In accordance with the operation of the aforedescribed third conventional picture generating apparatus, parameters necessary for linearly interpolating screen coordinates, a color value, and texture coordinates corresponding to a primitive such as a triangle are set to the DDA unit. The DDA unit linearly interpolates screen coordinates, a color value, and texture coordinates with the parameters. At this point, the Y coordinate value of the screen coordinates is an even value. In other words, drawing pixels of even scan lines and Y coordinate values of the screen coordinates are odd values. Drawing pixels of odd scan lines are processed at the same time so as to calculate the screen coordinates, color value, and texture coordinates of each drawing pixel.

The TMAP unit converts texture coordinates of drawing pixels of even scan lines obtained by the DDA unit into physical addresses of the TBUF unit, reads texture data from the TBUF unit, and maps the texture data of the drawing pixels. The TMAP unit converts texture coordinates of drawing pixels of odd scan lines obtained by the DDA unit into physical addresses of the TBUF unit, reads texture data from the TBUF unit, and maps the texture data of the drawing pixels.

The MEMIF unit reads a Z coordinate value stored in the ZBUF unit with the (X, Y) coordinates of each drawing pixel of the even scan lines of which texture data has been mapped by the TMAP unit and compares the Z coordinate values with that of the drawing pixel. When they match, the MEMIF unit rewrites the Z coordinate value of the drawing pixel to the ZBUF unit. At this point, if necessary, with the (X, Y) coordinates of the drawing pixel, drawing data stored in the FBUF unit is read. The drawing data and the color value of the drawing pixel are logically operated. Thereafter, the resultant color value is written to the FBUF unit.

The MEMIF unit reads the Z coordinate value stored in the ZBUF unit with the (X, Y) coordinates of each drawing pixel of the odd scan lines of which texture data has been mapped by the TMAP unit and compares the Z coordinate value with that of the drawing pixel. When they match, the MEMIF unit rewrites the Z coordinate value of the drawing pixel to the ZBUF unit. At this point, if necessary, with the (X, Y) coordinates of the drawing pixel, the drawing data is read from the FBUF unit. The drawing data and the color value of the drawing pixel are logically operated. The resultant color value is written to the FBUF unit. When data is displayed, the MEMIF units successively read drawing data from the FBUF units and send the drawing data to the display system through a signal line.

As described above, the ZBUF units store data of even scan lines. The ZBUF units store data of odd scan lines.

Texture data is stored in the TBUF units. Regarding the relation between screen coordinates and texture coordinates, when only the X coordinate, not the Y coordinate is varied on the screen coordinates, both the U and V coordinates vary. In addition, the amounts of changes of the U and V coordinates are not constant. Thus, since texture data cannot be categorized as drawing pixels of even scan lines and odd scan lines, the same texture data is redundantly stored in the TBUF units.

Accordingly, in the first conventional picture generating apparatus described above, texture data is stored in a dedicated texture memory. Thus, in the case of an application that does not use the Z buffer method, an application that draws a picture with a single buffer, or an application with a small display area, even if a memory that stores a Z coordinate value and a memory that stores drawing data have free areas, texture data cannot be flexibly stored.

In the second of the conventional picture generating apparatus described above, although data can be flexibly stored, when desired texture data is not present in the TCACHE unit, unless a square area of desired texture data is sent from the ZBUF unit to the TCACHE unit, the texture data cannot be mapped. In addition, during this period, since the ZBUF unit is not accessed, the performance of the apparatus is deteriorated.

In the third conventional picture generating apparatus described above, since the same texture data is redundantly stored, the cost thereof increases.

Accordingly, there has been a long existing need for enhanced image data processing which solves the problems of the conventional picture generating apparatuses of the prior art and to provide a picture generating apparatus that can flexibly map texture data with a relatively inexpensive structure and at a high speed. The present invention clearly fulfills these needs.

SUMMARY OF THE INVENTION

Briefly, and in general terms, the present invention provides a new and improved method and apparatus for processing image data which maps texture data more rapidly and at lower cost.

More particularly, by way of example and not necessarily by way of limitation, the present invention provides picture generating apparatus, comprising a memory having a read/write port and a dedicated read port, and a coordinate converting means for calculating a physical address of texture data with texture coordinates corresponding to a drawing pixel, wherein texture data and drawing data that is output to a display unit or a Z coordinate value used for removing a hidden surface are simultaneously stored and preserved in the memory, wherein the drawing data or the Z coordinate value is read or written through the read/write port, and wherein the coordinate converting means reads the texture data through the dedicated read port. Hence, the dedicated read port and the read/write port can operate in parallel reducing the load on the read/write port, reduces down time periods and thereby increases effective speed.

Furthermore, the present invention also provides a picture generating method, comprising the steps of coexistently storing texture data and drawing data that is output to a display unit or a Z coordinate value used for removing a hidden surface to a memory that has a read/write port and a dedicated read port, reading or writing drawing data or a Z coordinate value through the read/write port, and calculating a physical address of texture data with texture coordinates corresponding to a drawing pixel and reading the texture data through the dedicated read port.

The memory may include a DRAM unit accessed with a row address and a column address, and an auxiliary memory for temporarily storing part of data of the DRAM unit, wherein the coordinate converting means reads texture data corresponding to a drawing pixel from the auxiliary memory through the dedicated read port when desired texture data is present in the auxiliary memory, and wherein the coordinate converting means writes data of all or part of a row of texture data to the auxiliary memory and reads the desired texture data from the auxiliary memory through the dedicated read port when the desired texture data is not present in the auxiliary memory.

When a plurality of coordinate converting means are disposed for processing texture data in parallel, a plurality of memories are disposed corresponding to the plurality of coordinate converting means. Alternatively, the auxiliary memory has a plurality of read ports corresponding to the plurality of coordinate converting means. Thus, the plurality of coordinate converting means read the texture data from the memory at the same time.

In accordance with the present invention, texture data can be stored in free areas of the memory for a Z coordinate value and the memory for drawing data. Thus, the memories can be flexibly and effectively used. In addition, texture data can be mapped at high speed. When texture data is processed in parallel, it is not necessary to redundantly store the same texture data, thereby reducing the cost of the apparatus.

Hence, the present invention satisfies a long existing need for enhanced image data processing for picture generation which can flexibly map texture data at increased speed and lower cost.

These and other objects and advantages of the invention will become apparent from the following more detailed description, when taken in conjunction with the accompanying drawings of illustrative embodiments.

DETAILED DESCRIPTION OF THE PREFERRED EMBODIMENTS

Figure 1:
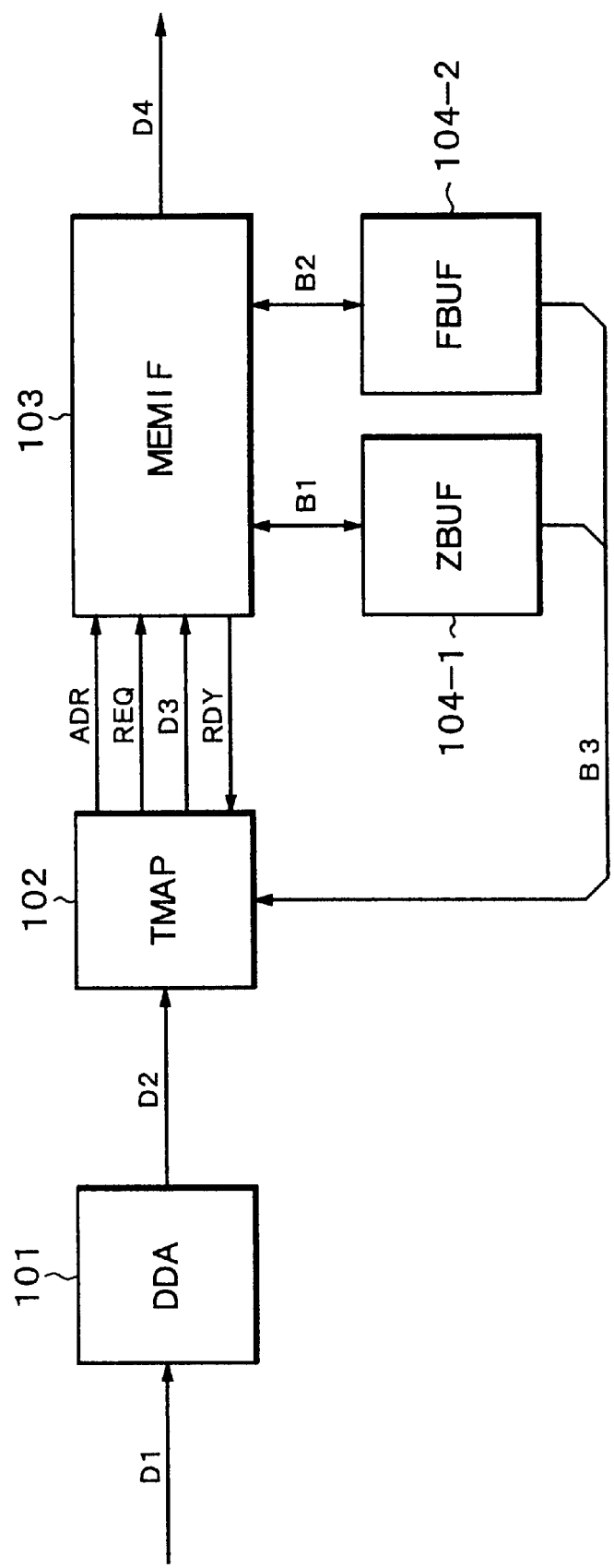
FIG. 1 is a block diagram illustrating the structure of a picture generating apparatus according to a first embodiment of the present invention.

Referring now to the drawings, like reference numerals denote like or corresponding parts throughout the drawing figures.

Figure 9:
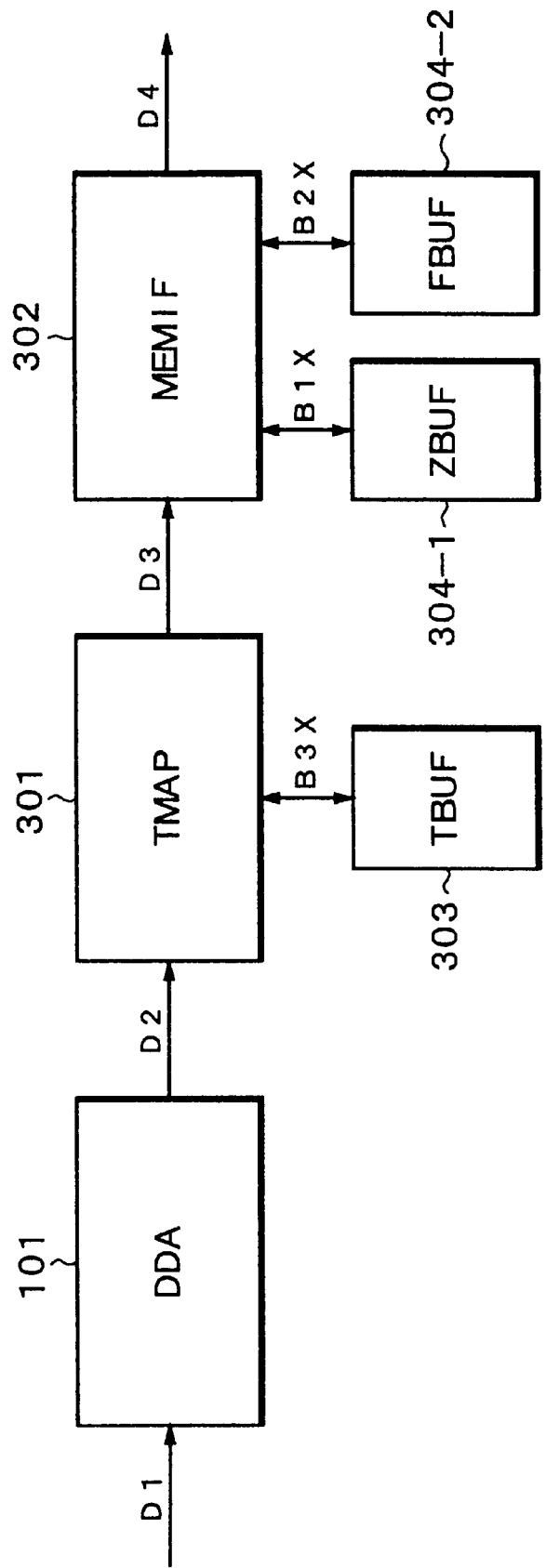
FIG. 9 is a block diagram illustrating the structure of a conventional picture generating apparatus.

One example of the structure of a conventional picture generating apparatus is shown in FIG. 9, where an interpolating unit 101 (hereinafter, referred to as the DDA (Digital Differential Analyzer) unit) receives color values, coordinates and texture coordinates of vertexes of the polygon and linearly interpolates a color value, a coordinate value and a texture coordinate for each drawning pixel of the polygon unit. A texture memory unit 303 (hereinafter, referred to as the TBUF unit) that is a memory for texture data. A Z coordinate memory unit 304-1 (hereinafter, referred to as the ZBUF unit) that is a memory for a Z coordinate value used for removing a hidden surface. A drawing data memory unit 304-1 (hereinafter, referred to as the FBUF unit) that is a memory for drawing data. A texture mapping unit 301 (hereinafter, referred to as the TMAP unit) that converts texture coordinates corresponding to each drawing pixel obtained by the DDA unit 101 into a physical address of the TBUF unit 303 and maps the texture data. A memory interface unit 302 (hereinafter, referred to as the MEMIF unit) that reads/writes a Z coordinate value from/to the ZBUF unit 304-1 and reads/writes drawing data from/to the FBUF unit 304-2.

A signal line D1 is provided for setting a parameter to DDA 101 and for loading texture data to TBUF 303. Signal lines D2 and D3 send data to the next stage. A signal line D4 sends display data to a display system. A bus B3X is for loading and reading texture data. A bus B1X is for reading/writing a Z coordinate value. A bus B2X is for reading/writing drawing data.

Next, the operation of the above-described conventional picture generating apparatus will be explained. Parameters necessary for linearly interpolating screen coordinates, a color value, and texture coordinates for each primitive (that is, for each polygon) such as a triangle are set to the DDA unit 101. For each polygon, color values, screen coordinates and texture coordinates of vertexes of the polygon as parameters are provided to the DDA unit 101 via the signal line D1. The DDA unit 101 linearly interpolates screen coordinates, Z coordinates, a color value, and texture coordinates in the polygon with such parameters so as to calculate screen coordinates, color value, and texture coordinates for each drawing pixel. The calculated screen coordinates, color value and texture coordinates for each drawing pixel are provided to the TMAP 301 via the signal line D2. The TMAP unit 301 converts the texture coordinates obtained by the DDA unit 101 into a physical address of the TBUF unit 303, reads the texture data from the TBUF unit 303 in accordance with the physical address, and maps the texture data for each drawing pixel.

The screen coordinates, color value and the pixel mapped texture data are provided to the MEMIF unit 302. The MEMIF unit 302 reads a Z coordinate value stored in the ZBUF unit 304-1 with (X, Y) coordinates of the screen of the drawing pixel of which the texture data has been mapped by the TMAP unit 301 and compares the Z coordinate value with that of the drawing pixel. When they match, the drawing pixel is drawn, the MEMIF unit 302 rewrites the Z coordinate value of the drawing pixel to the ZBUF unit 304-1. At this point, if necessary, the drawing data stored in the FBUF unit 304-2 is read with the (X, Y) coordinates of the screen coordinates of drawing pixel. The drawing data and the color value of the drawing pixel are logically operated to provide proper blending. The resultant color value is written to the FBUF unit 304-2. When data is displayed, the MEMIF unit 302 successively reads drawing data from the FBUF unit 304-2 and sends the drawing data to the display system through the signal line D4. The texture data is provided via line D1 and is loaded to the TBUF unit 303 via the DDA unit 101 and the TMAP unit 301.

Figure 10:
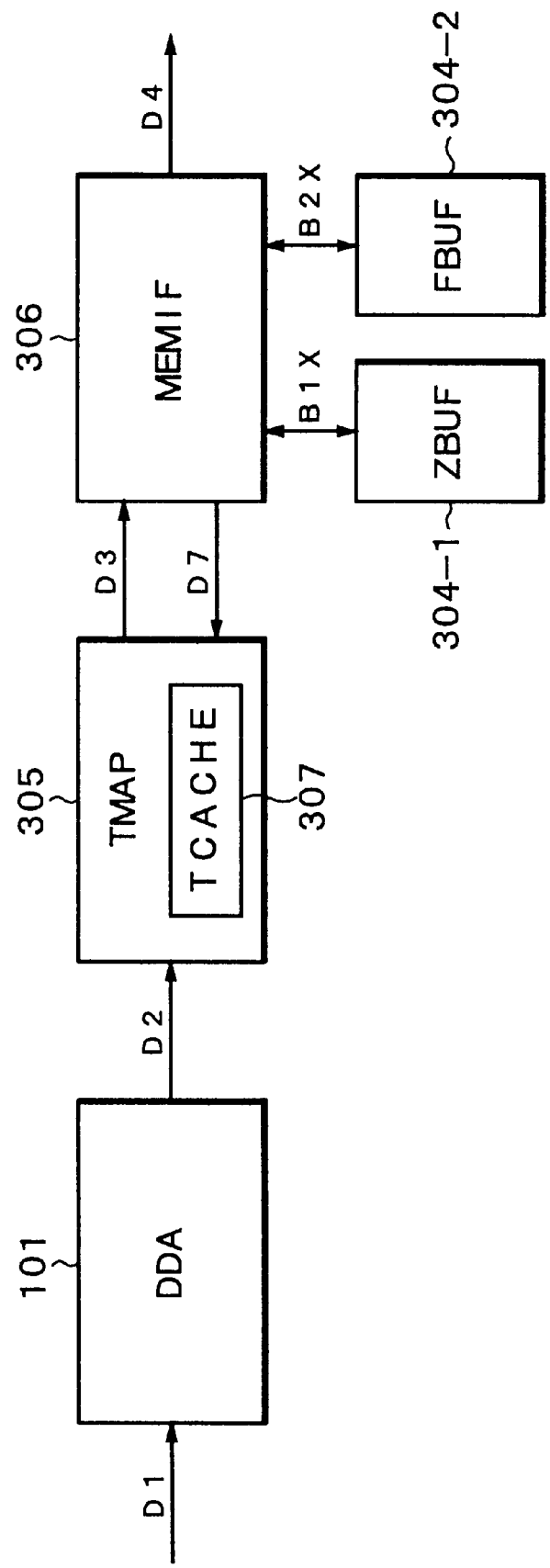
FIG. 10 is a block diagram illustrating the structure of another conventional picture generating apparatus.

FIG. 10 is a block diagram showing the structure of another conventional picture generating apparatus. In FIG. 10, texture data is stored in free areas of a ZBUF unit 304-1 that stores a Z coordinate value and an FBUF unit 304-2 that stores drawing data. In addition, the TMAP unit 305 that maps texture data of each drawing pixel includes a texture cache unit 307 (hereinafter, referred to as the TCACHE unit) that stores a part of the texture data. Reference numeral D7 is a signal line for sending texture data that has been read from the ZBUF unit 304-1 and the FBUF unit 304-2 to the TCACHE unit 307.

The operation of the second conventional picture generating apparatus shown in FIG. 10 is the same as the operation of the first conventional apparatus shown in FIG. 9 except for the texture mapping operation. Thus, only the texture mapping operation of the picture generating apparatus shown in FIG. 10 will be described in the following. Since the TCACHE unit 307 is composed of an SRAM, the storage capacity thereof is relatively small.

Texture data has been divided into a square or rectangular area with the size corresponding to the TCACHE unit 307. The texture data is stored in free areas of the ZBUF unit 304-1 and the FBUF unit 304-2. When texture data corresponding to a drawing pixel is present in the TCACHE unit 307, the TMAP unit 305 reads the texture data from the TCACHE unit 307 and maps the texture data for the drawing pixel. When texture data corresponding to the drawing pixel is not present in the TCACHE unit 307, the TMAP unit 305 successively reads the square or rectangular areas of the texture data from the ZBUF unit 304-1 or the FBUF unit 304-2, loads the square or rectangular areas to the TCACHE unit 307, and then maps the texture data of the drawing pixel.

Figure 11:
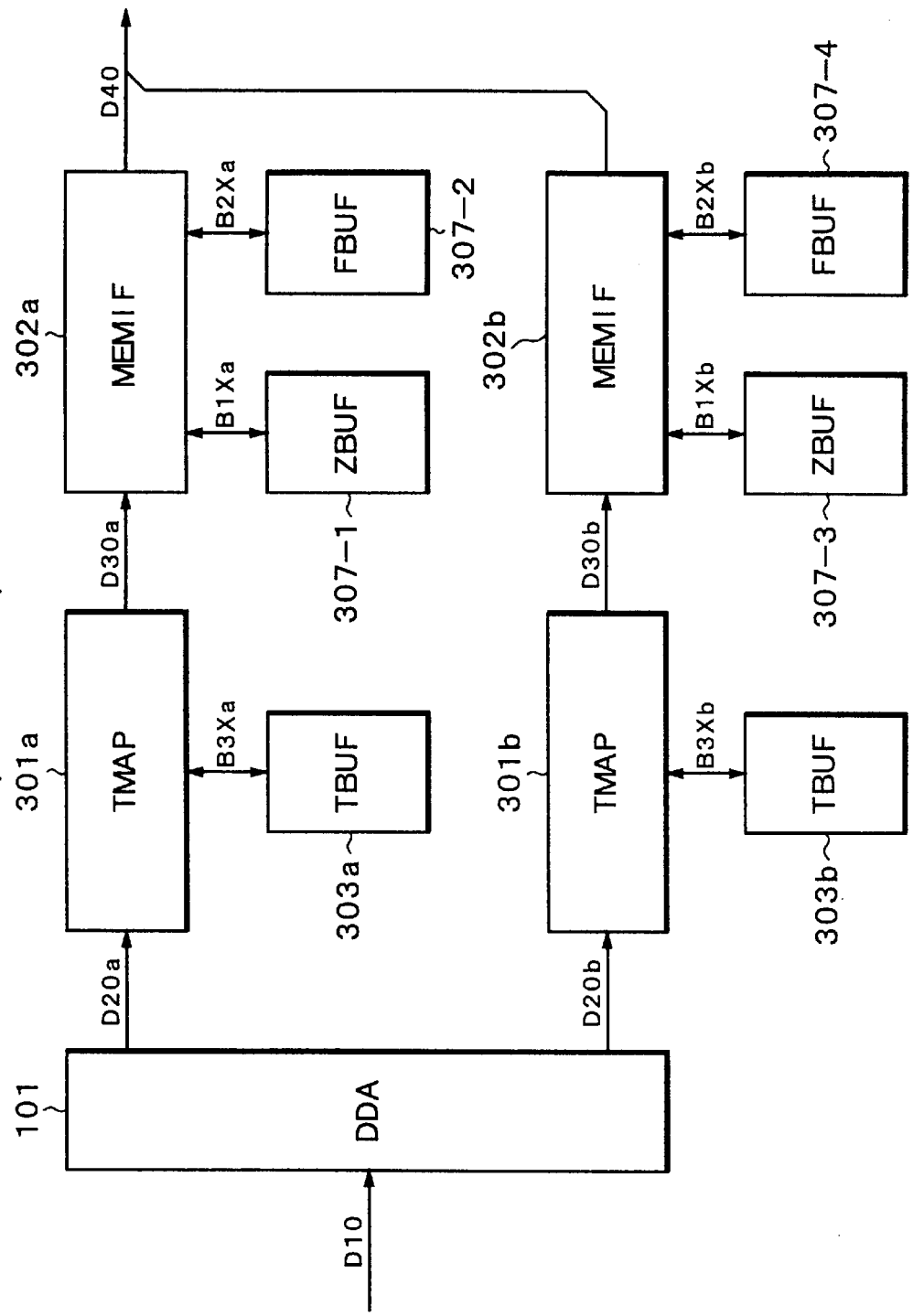
FIG. 11 is a block diagram illustrating the structure of an additional conventional picture generating apparatus.

FIG. 11 is a block diagram showing the structure of a third conventional picture generating apparatus that processes texture data in parallel. In FIG. 11, a DDA unit 101 receives color values, coordinates and texture coordinates of vertexes of the polygon and linearly interpolates a color value, a coordinate value and a texture coordinate in the polygon each polygon unit. TBUF units 303a and 303b are memories for texture data. ZBUF units 307-1 and 307-3 are memories for Z coordinate values used for removing a hidden surface. FBUF units 307-2 and 307-4 are memories for drawing data. Reference numerals 301a and 301b are TMAP units that convert texture coordinates of each drawing pixel obtained by the DDA unit 101 into physical addresses of the DDA units 303a and 303b. MEMIF units 302a and 302b read/write Z coordinate values from/to the ZBUF units 307-1 and 307-3 and read/write drawing data from/to the FBUF units 307-2 and 307-4.

A signal line D10 is used for setting a parameter and loading texture data. Signal lines D20a, D20b, D30a and D30b are used for sending data to the next stage. A signal line D40 is used for sending display data to the display system. Buses B3Xa and B3Xb are used for loading and reading texture data. Buses B1Xa and B1Xb are used for reading/writing Z coordinate values. Buses B2Xa and B2Xb are used for reading/writing drawing data.

Next, the operation of the above-described third conventional picture generating apparatus will be explained. Parameters necessary for linearly interpolating screen coordinates, a color value, and texture coordinates for each primitive (that is, for each polygon) such as a triangle are set to the DDA unit 101. For each polygon, color values, screen coordinates and texture coordinates of vertexes of the polygon as parameter are provided to the DDA unit 101 via the signal line D1. The DDA unit 101 linearly interpolates screen coordinates, Z coordinates, a color value, and texture coordinates in the polygon with the parameters. At this time, the drawing pixels for which the Y coordinates value of the screen coordinates is an even value, that is, the drawing pixels belonging to even scan lines are processed at the same time that the drawing pixels for the Y coordinates value of the screen coordinates are odd values, that is, the drawing pixels belonging to odd scan lines are processed. Thereby, the screen coordinates, color value and texture coordinates for each drawing pixel of each line are calculated.

The calculated screen coordinates, color value and texture coordinates for each drawing pixel of the even scan lines are provided to the TMAP 301a via the signal line D20a. The TMAP unit 301a converts texture coordinates of drawing pixels of even scan lines obtained by the DDA unit 101 into physical addresses of the TBUF unit 303a, reads texture data from the TBUF unit 303a in accordance with the physical address, and maps the texture data of the drawing pixels. The calculated screen coordinates, color value and texture coordinates for each drawing pixel of the odd scan lines are provided to the TMAP 301b via the signal line D20b. The TMAP unit 301b converts texture coordinates of drawing pixels of odd scan lines obtained by the DDA unit 101a into physical addresses of the TBUF unit 303b, reads texture data from the TBUF unit 303b in accordance with the physical address, and maps the texture data of the drawing pixels.

The MEMIF unit 302a reads a Z coordinate value stored in the ZBUF unit 307-1 with the (X, Y) coordinates of the screen coordinates of each drawing pixel of the even scan lines of which texture data has been mapped by the TMAP unit 301a and compares the Z coordinate values with that of the drawing pixel. When they match, the drawing pixel is drawn, the MEMIF unit 302a rewrites the Z coordinate value of the drawing pixel to the ZBUF unit 307-1. At this point, if necessary, with the (X, Y) coordinates of the screen coordinates of the drawing pixel, drawing data stored in the FBUF unit 307-2 is read. The drawing data and the color value of the drawing pixel are logically operated. Thereafter, the resultant color value is written to the FBUF unit 307-2.

The MEMIF unit 302b reads the Z coordinate value stored in the ZBUF unit 307-3 with the (X, Y) coordinates of the screen coordinates of each drawing pixel of the odd scan lines of which texture data has been mapped by the TMAP unit 301b and compares the Z coordinate value with that of the drawing pixel. When they match, the drawing pixel is drawn, the MEMIF unit 302b rewrites the Z coordinate value of the drawing pixel to the ZBUF unit 307-3. At this point, if necessary, with the (X, Y) coordinates of the drawing pixel, the drawing data is read from the FBUF unit 307-4. The drawing data and the color value of the drawing pixel are logically operated. The resultant color value is written to the FBUF unit 307-4. When data is displayed, the MEMIF units 302a and 302b successively read drawing data from the FBUF units 307-2 and 307-4 and send the drawing data to the display system through the signal line D40.

As described above, the ZBUF units 307-1 and 307-2 store data of even scan lines. The ZBUF units 307-3 and 307-4 store data of odd scan lines.

Figure 12:
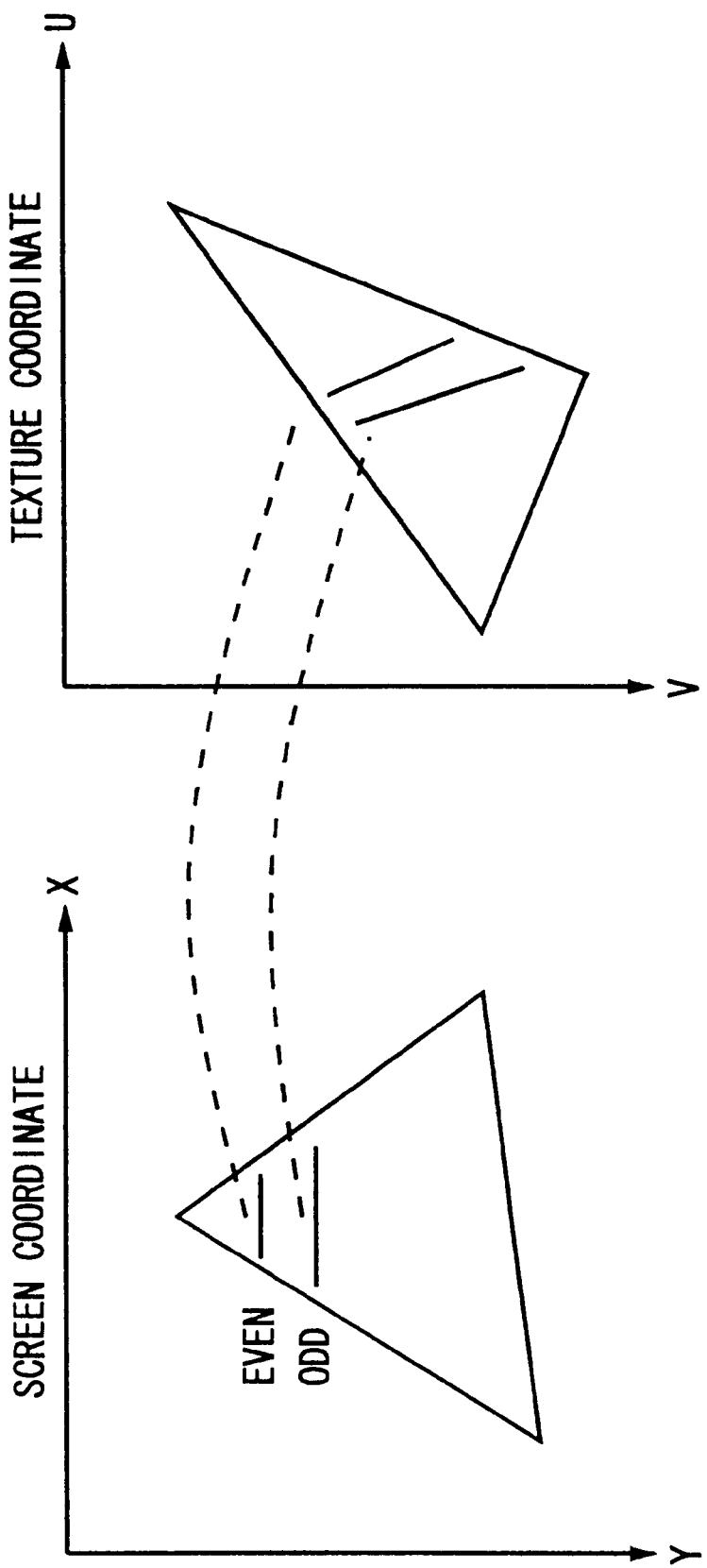
FIG. 12 is a schematic diagram for explaining the relation between screen coordinates and texture coordinates therefore

Next, texture data stored in the TBUF units 303a and 303b will be described. FIG. 12 shows the relation between screen coordinates and texture coordinates. As shown in FIG. 12, when only the X coordinate, not the Y coordinate is varied on the screen coordinates, both the U and V coordinates vary. In addition, the amounts of changes of the U and V coordinates are not constant. Thus, since texture data cannot be categorized as drawing pixels of even scan lines and odd scan lines, the same texture data is redundantly stored in the TBUF units 303a and 303b.

In the first conventional picture generating apparatus shown in FIG. 9, texture data is stored in a dedicated texture memory. Thus, in the case of an application that does not use the Z buffer method, an application that draws a picture with a single buffer, or an application with a small display area, even if a memory that stores a Z coordinate value and a memory that stores drawing data have free areas, texture data cannot be flexibly stored.

In the second conventional picture generating apparatus shown in FIG. 10, although data can be flexibly stored, when desired texture data is not present in the TCACHE unit 307, unless a square area of desired texture data is sent from the ZBUF unit 304-1 or 304-2 to the TCACHE unit 307, the texture data cannot be mapped. In addition, during this period, since the ZBUF unit 304-1 or 304-2 is not accessed, the performance of the apparatus is deteriorated.

In the third conventional picture generating apparatus, since the same texture data should redundantly stored, the cost thereof increases.

Next, with reference to the accompanying drawings, and for the express purpose of resolving the foregoing difficulties with the various conventional picture generating systems of the prior art, several embodiments of the present invention will be described.

FIG. 1 is a block diagram showing the structure of a picture generating apparatus according to a first embodiment of the present invention. In FIG. 1 a DDA unit 101 that linearly interpolates a color value, a coordinate value and texture coordinate for each drawing pixel of the polygon unit. A ZBUF unit 104-1 is a memory for a Z coordinate value used for removing a hidden surface. A FBUF unit 104-2 is a memory for drawing data. Texture data is stored in free areas of the ZBUF unit 104-1 and the FBUF unit 104-2.

The calculated screen coordinates, color value and texture coordinates for each drawing pixel are provided to the TMAP unit 102 via signal line D2. A TMAP unit 102 converts texture coordinates of each drawing pixel obtained by the DDA unit 101 to physical addresses of the ZBUF unit 104-1 and the FBUF unit 104-2. A MEMIF unit 103 reads/writes a Z coordinate value from/to the ZBUF unit 104-1 and reads/writes drawing data from/to the FBUF unit 104-2. A signal line D1 is used for setting a parameter and loading texture data. Signal lines D2 and D3 send data to the next stage. Signal line D4 is used for sending display data to a display system. A bus B1 is used for reading/writing a Z coordinate value. A bus B2 is used for reading/writing drawing data.

The calculated screen coordinates, color value and texture coordinates for each drawing pixel are provided to the TMAP unit 102 via the signal line D2. Next, the operation of the picture generating apparatus according to the first embodiment of the present invention will be explained. Since the operation of the DDA unit 101 is the same as that of the DDA unit of each of the conventional picture generating apparatuses shown in FIGS. 9 and 10, the description thereof is omitted. First of all, texture data is sent to the MEMIF unit 103 through the DDA unit 101 and the TMAP unit 102. The texture data is loaded to free areas of the ZBUF unit 104-1 and the FBUF unit 104-2. The TMAP unit 102 converts texture coordinates obtained by the DDA unit 101 into a physical address of the ZBUF unit 104-1 or the FBUF unit 104-2, reads texture data from dedicated read ports of the ZBUF unit 104-1 and the FBUF unit 104-2 through the bus B3, and maps the texture data.

The MEMIF unit 103 compares Z coordinate values using the ZBUF unit 104-1 and stores drawing data to the FBUF unit 104-2 in the same manner as the MEMIF unit of each of the conventional picture generating apparatuses shown in FIGS. 9 and 10.

Figure 2:
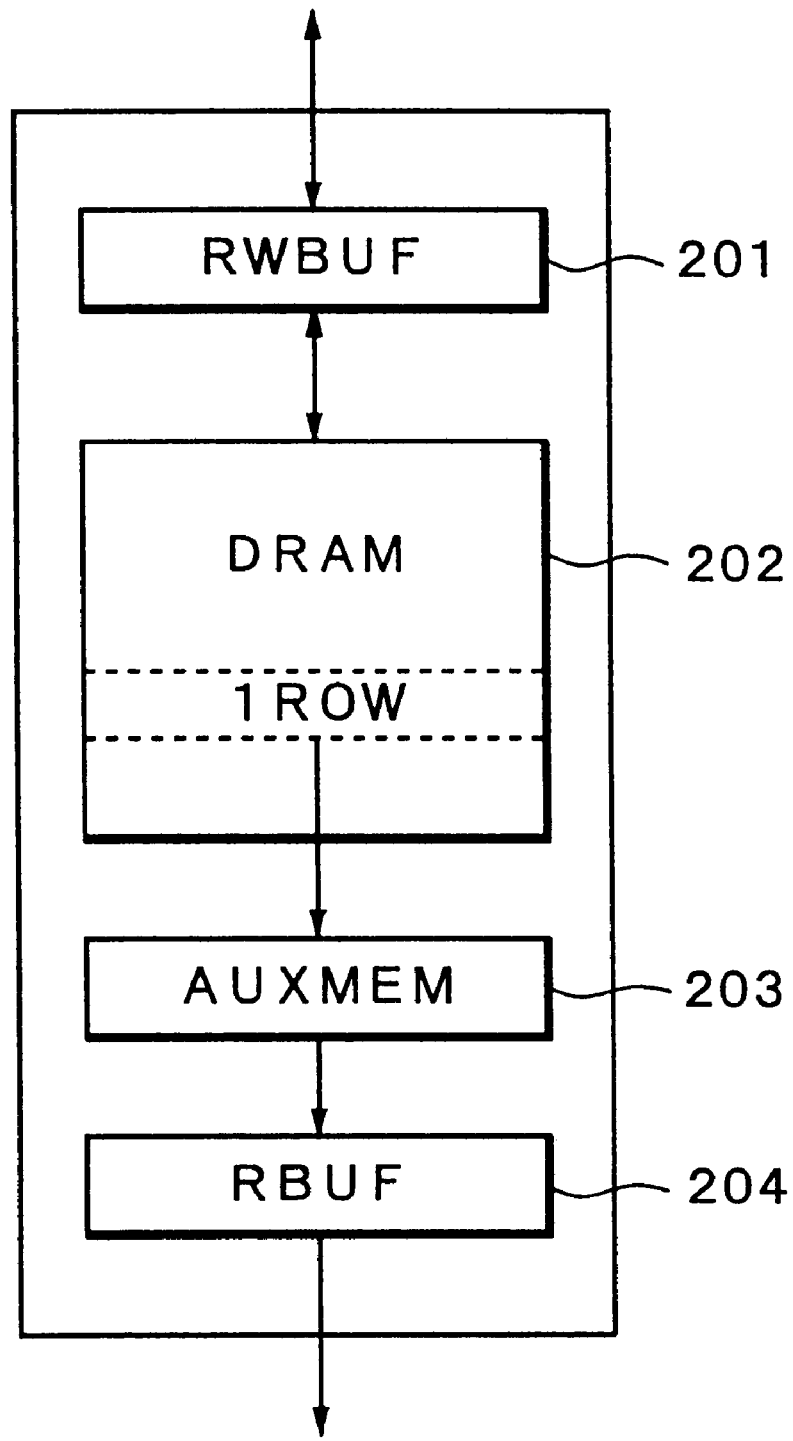
FIG. 2 is a block diagram showing the internal structure of a memory of the picture generating apparatus suitable for use with the embodiment of the invention shown in FIG. 1.

Next, the texture mapping operation will be described in detail. FIG. 2 shows the internal structure of a memory of each of the ZBUF unit 104-1 and the FBUF unit 104-2. In FIG. 2, there is shown a bidirectional buffer 201. A DRAM unit 202 is accessed with a row address and a column address. An auxiliary memory 203 (referred to as the AUXMEM unit) temporarily stores part of data stored in the DRAM unit 202. A read buffer 204 is connected to the bus B3. In the case of the ZBUF unit, the bidirectional buffer 201 is connected to the bus B1. In the case of the FBUF unit, the bidirectional buffer 201 is connected to the bus B2. A Z coordinate value or drawing data is read/written through the bidirectional buffer 201. Texture data is read through the buffer 204, but texture data is written through the buffer 201.

When desired texture data is present in the AUXMEM unit 203 of the ZBUF unit 104-1 or the FBUF unit 104-2, the TMAP unit 102 decodes a physical address calculated by the TMAP unit 102, selects desired texture data from the AUXMEM unit 203, enables the buffer 204 that stores the desired texture data, reads the desired texture data through the bus B3, and maps the texture data.

On the other hand, when desired texture data is not present in the AUXMEM units of the ZBUF unit 104-1 and the FBUF unit 104-2, the TMAP unit 102 sends a physical address of desired texture data to the MEMIF unit 103 through a signal line ADR (address) and causes a signal line REQ (request) to become active. The MEMIF unit 103 causes a row of desired texture data of the DRAM unit 202 of the ZBUF unit 104-1 or the FBUF unit 104-2 to be active and sends data of the entire row to the AUXMEM unit 203. Thereafter, the MEMIF unit 103 causes a signal RDY (ready) to become active so as to represent that the data has been sent. When the signal RDY becomes active, the TMAP unit 102 reads texture data in the manner that the desired texture data is present in the AUXMEM unit 203 of the ZBUF unit 104-1 or the FBUF unit 104-2 and maps the texture data.

As described above, according to the present invention, a memory (ZBUF unit) for a Z coordinate value used for removing a hidden surface and a memory (FBUF unit) for drawing data that is output to a display unit each have a DRAM unit and an auxiliary memory. Data of one row of the DRAM unit is sent to the auxiliary memory at a time. Thus, according to the present invention, the penalty in the case that desired texture data is not present in the auxiliary memory is low. In addition, according to the present invention, with the structure of which both the memories each have a dedicated read port and which drawing data and a Z coordinate value are read or written and texture data is read at the same time, texture data can be flexibly stored in free areas of both the memories. In addition, texture data can be mapped at high speed.

Figure 3:
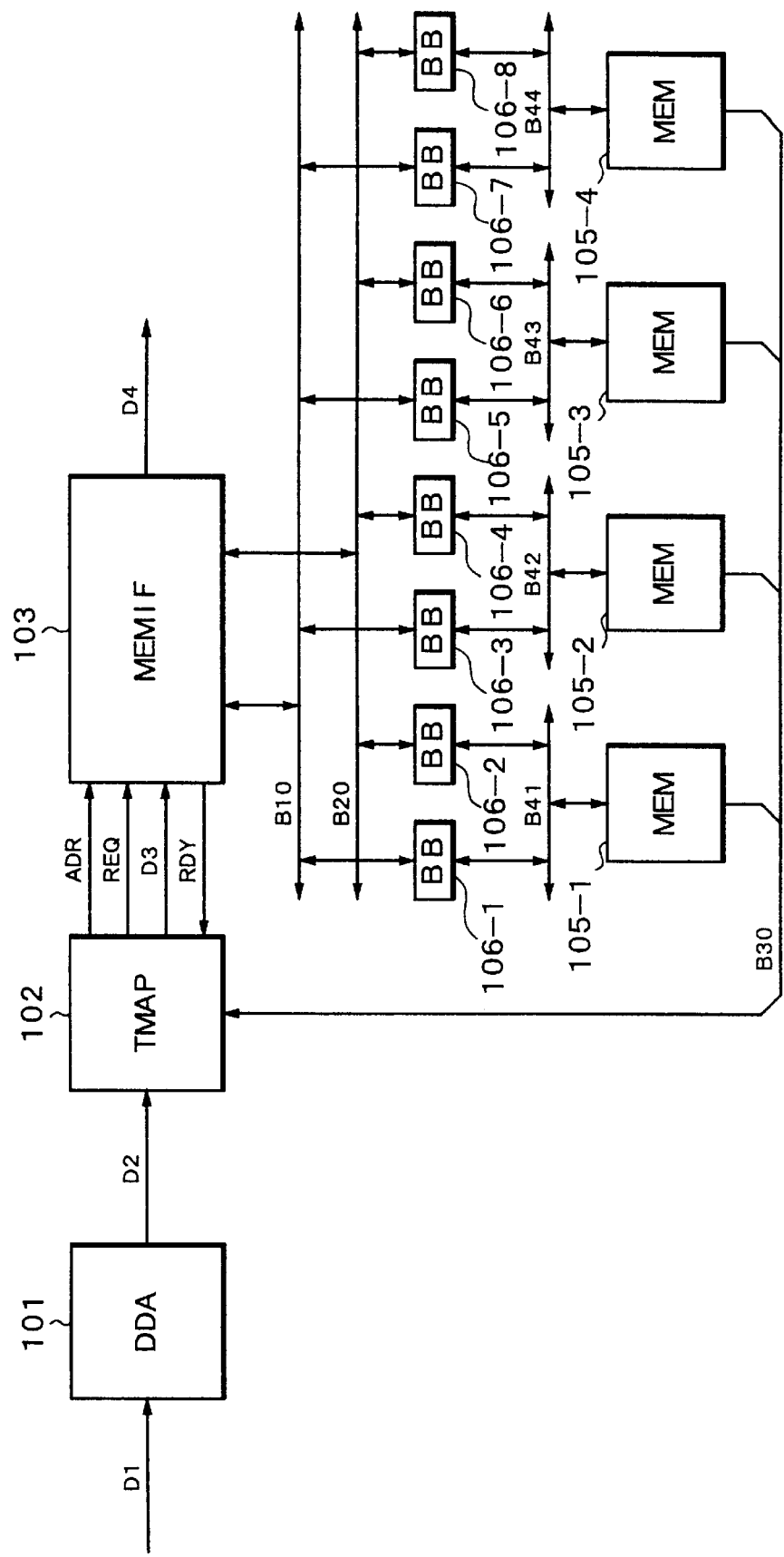
FIG. 3 is a block diagram illustrating the structure of a picture generating apparatus according to a second embodiment of the present invention.

FIG. 3 is a block diagram showing the structure of a picture generating apparatus according to a second embodiment of the present invention. In FIG. 3, a DDA unit 101, a TMAP unit 102, and an MEMF unit 103, respectively, are the same as those of the first embodiment shown in FIG. 1.

In addition, signal lines D1, D2, D3, D4, ADR, REQ, and RDY are the same as those of the first embodiment in FIG. 1. Memory units 105-1 to 105-4 (hereinafter, referred to as the MEM units) are provided for drawing data, a Z coordinate value, and texture data. The internal structure of the MEM units is the same as that shown in FIG. 2.

A bus B10 is used for reading/writing a Z coordinate value. A bus B20 is for reading/writing drawing data. Buses B41 to B44 are connected to respective RWBUFs 201 of the MEM units 105-1 to 105-4. A bus B30 is used for reading texture data. The bus B30 is connected to a RBUF 204 of the MEM unit. Bidirectional buffers 106-1 to 106-8 (hereinafter, referred to as the BBs) are also provided.

In the first embodiment shown in FIG. 1, the bus for reading/writing a Z coordinate value and the bus/memory used for reading/writing drawing data are fixedly connected. Thus, the memory for the Z coordinate value and the memory for the drawing data are clearly separated. On the other hand, in the second embodiment shown in FIG. 3, drawing data, Z coordinate value, and texture data are coexistently stored in the MEM units 105-1 to 105-4. In the structure shown in FIG. 3, the connections between the bus for reading/writing the Z coordinate value and the bus/memory for reading/writing drawing data can be freely varied. Thus, the flexibility of the apparatus is improved. For example, in the case of an application that does not use the Z buffer method, all the MEM units 105-1 to 105-4 can be used for storing drawing data and texture data. Thus, the apparatus can be used for a display system with high display resolution. On the other hand, when the MEM units 105-1 and 105-2 are used as memories for Z coordinate value and the MEM units 105-3 and 105-4 are used as memories for storing drawing data, since each of Z coordinate value and drawing data is stored in two memory banks, using the memory interleave method, data can be drawn at higher speed than the other structures.

Figure 4:
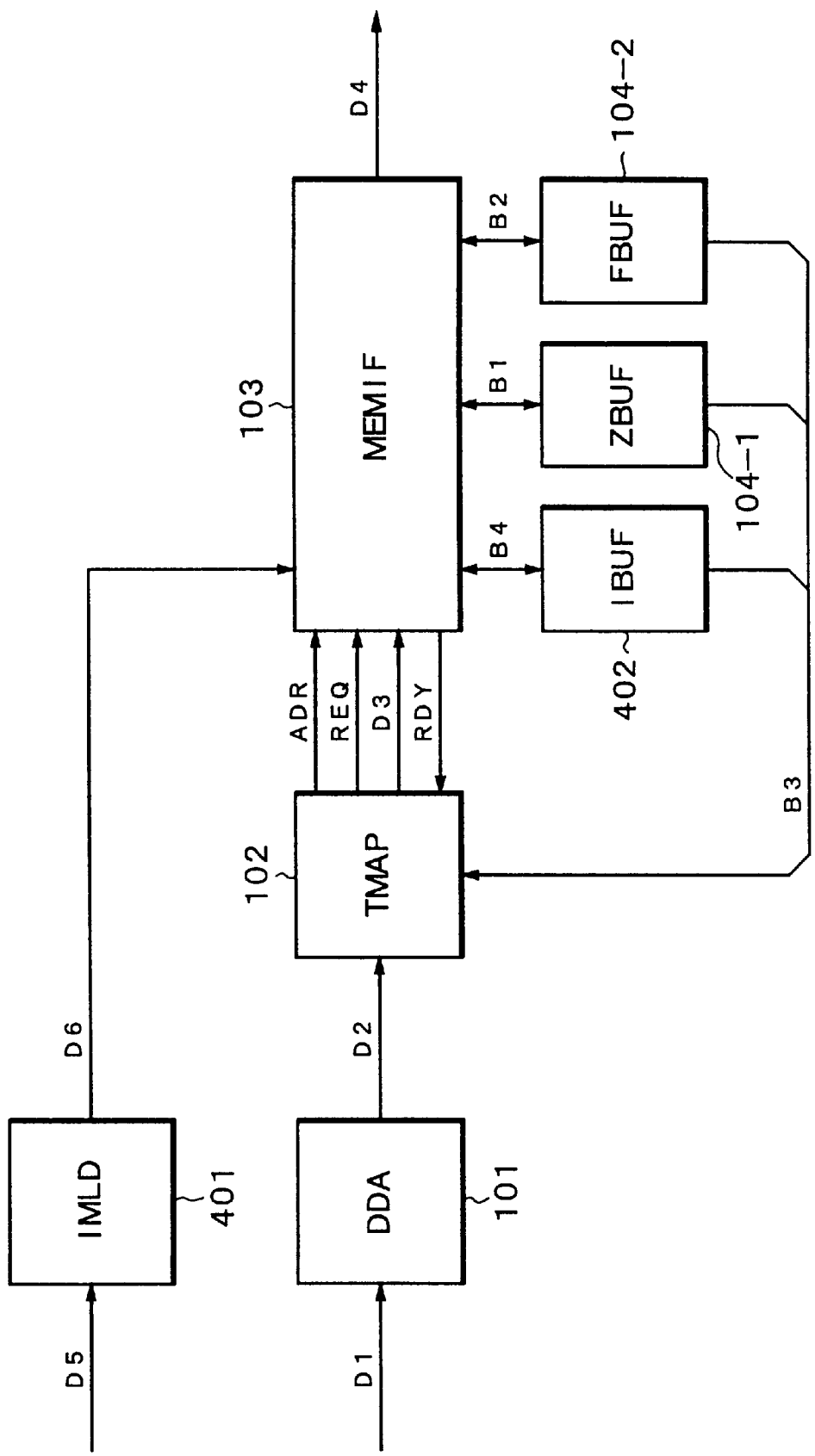
FIG. 4 is a block diagram illustrating the structure of a picture generating apparatus according to a third embodiment of the present invention.

FIG. 4 is a block diagram showing the structure of a picture generating apparatus according to a third embodiment of the present invention. In FIG. 4, a picture inputting means 401 (hereinafter, referred to as the IMLD unit) loads picture data. In fact, the IMLD unit is an interface for an external video unit or an external storage unit. The IMLD unit handles handshake of video or texture data and a timing control of video or texture data transmission between the external video unit or the external storage unit and the MEMIF unit. A memory unit 402 (hereinafter, referred to as the IBUF unit) stores picture data and texture data. Signal lines D5 and D6 are for loading picture data. A bus B4 is for loading picture data and reading picture data to be displayed. The other structure of the third embodiment is the same as that of the first embodiment shown in FIG. 1.

Next, the operation of the picture generating apparatus according to the third embodiment will be described. As with the first embodiment, texture data that is frequently used and thereby should always reside in a memory is sent to an MEMIF unit 103 through a DDA unit 101 and a TMAP unit 102 and then loaded to free areas of a ZBUF unit 104-1 and an FBUF unit 104-2. On the other hand, texture data that is not frequently used and that should be frequently changed is read from an external storing unit and sent to the IMLD unit 401 through the signal line D5.

The IMLD unit 401 sends the texture data to the MEMIF unit 103 through the signal line D6. The MEMIF unit 103 loads the texture data to the IBUF unit 402 through the bus B4. Moving picture data such as a video picture that should be rewritten 30 to 60 times per second is loaded to the IBUF unit 402 through the same path. The internal structure of the IBUF unit 402 is the same as that of the ZBUF unit 104-1 and the FBUF unit 104-2. The texture data or moving picture data that is loaded to the IBUF unit 402 is read from the dedicated read port of the IBUF unit 402 through the bus B3 in the same manner as the first embodiment and then mapped.

As described above, according to the third embodiment of the present invention, the apparatus has the IMLD unit 401 that is a picture inputting means. Drawing data and a Z coordinate value are read or written texture data is read, and texture data and moving picture data are loaded at the same time. Thus, in the case of an application that uses many textures that exceed the storage capacity of a local memory, the decrease of the performance due to changes of texture data can be minimized. In addition, texture data of moving picture data can be mapped.

Figure 13:
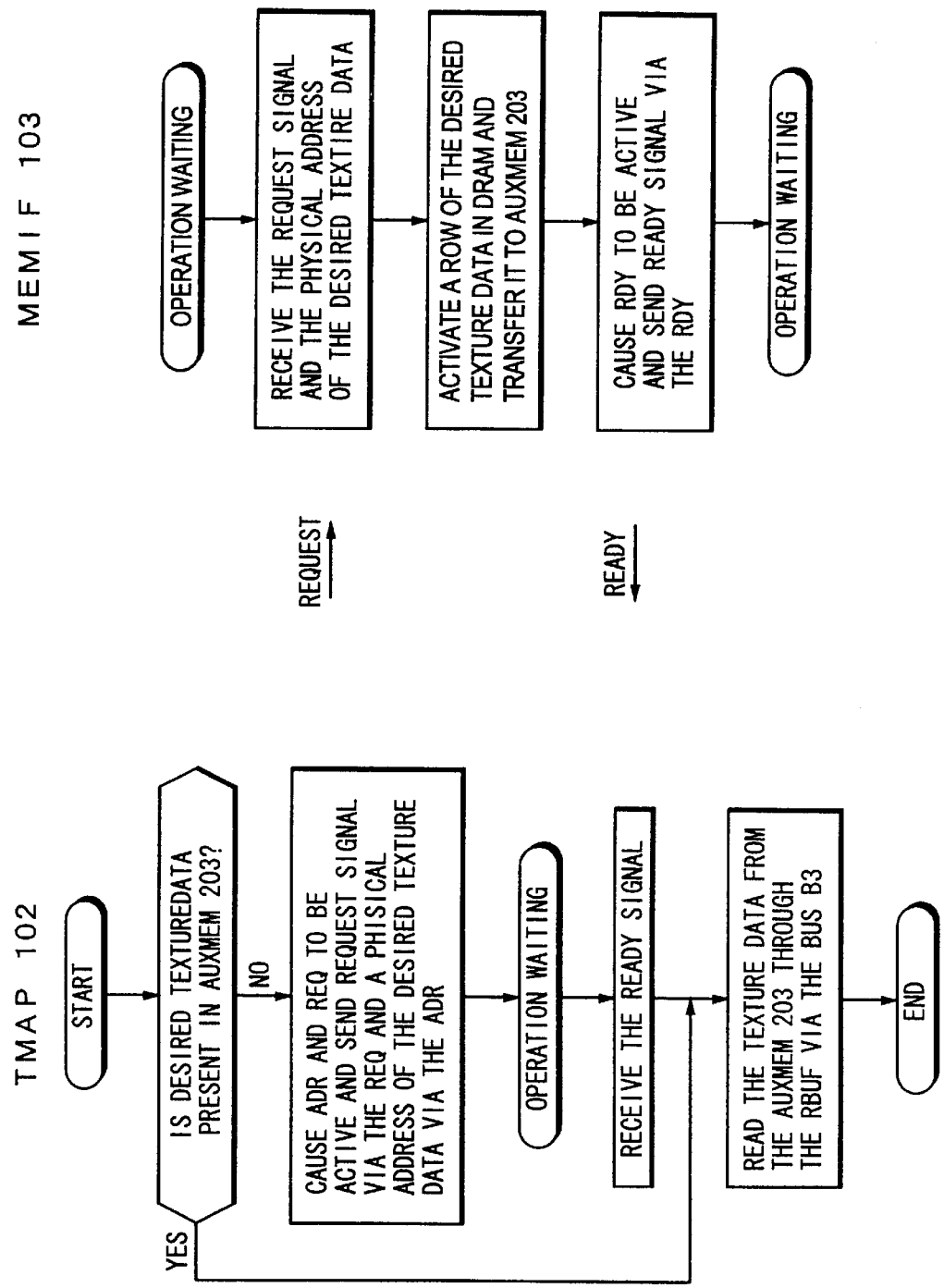
FIG. 13 is a flowchart illustrating the operation of the TMAP and MEMIF units shown in FIGS. 1, 3, and 4 using the memory structure shown in FIG. 2.

FIG. 13 is a flowchart describing the operation of the TMAP and MEMIF units shown in FIGS. 1, 3, and 4 using the memory structure shown in FIG. 2. Persons of ordinary skill in the art will appreciate that this flowchart is self-explanatory for the sequence of operations performed using the hardware structure disclosed in the embodiments of FIGS. 1–4.

Figure 5:
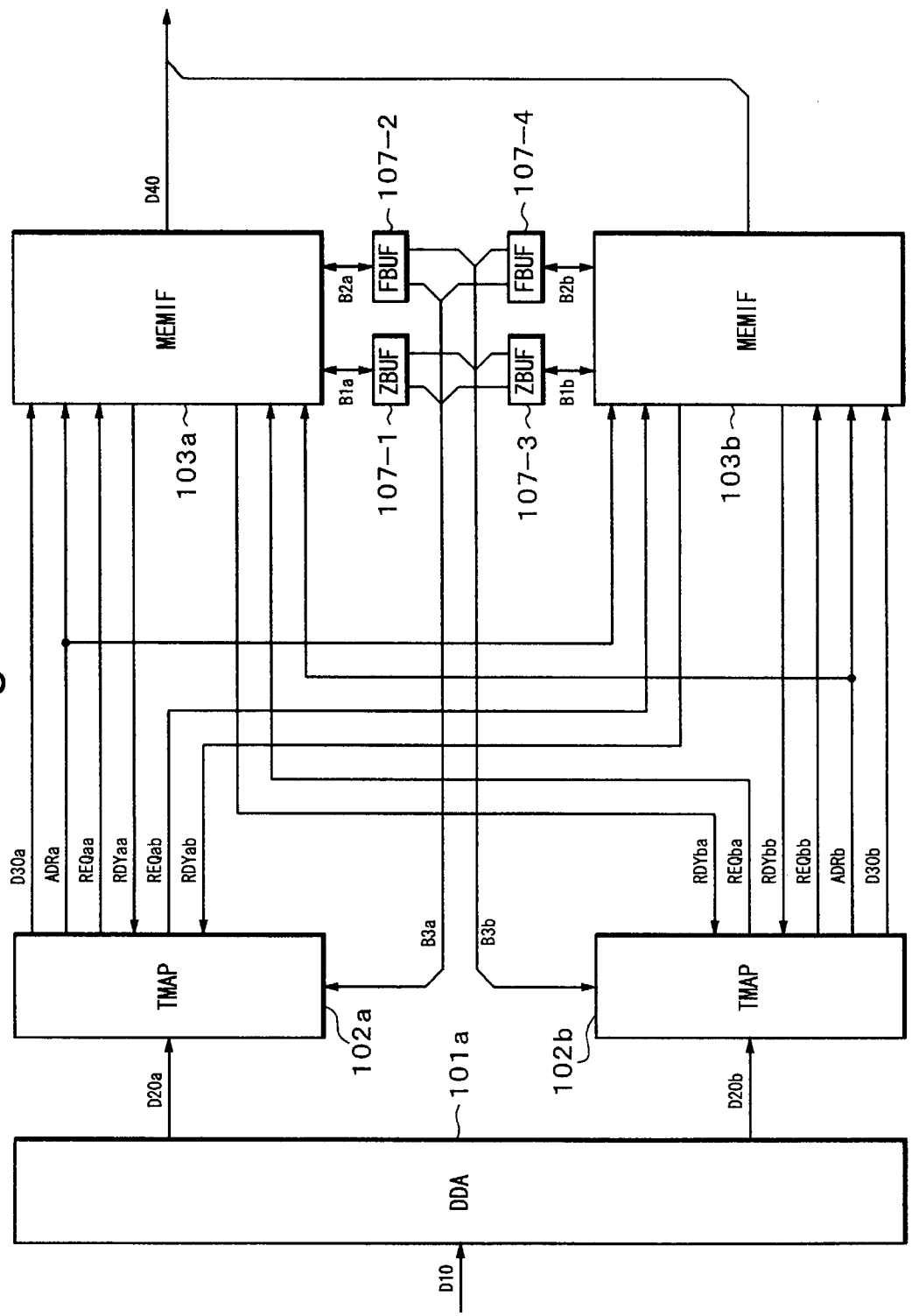
FIG. 5 is a block diagram illustrating the structure of a picture generating apparatus according to a fourth embodiment of the present invention.

FIG. 5 is a block diagram showing the structure of a picture generating apparatus according to a fourth embodiment of the present invention. In FIG. 5, a DDA unit 101a linearly interpolates a color value and a coordinate value. ZBUF units 107-1 and 107-3 are memories for Z coordinate values used for removing a hidden surface. FBUF units 107-2 and 107-4 are memories for drawing data. TMAP units 102a and 102b convert texture coordinates of each drawing pixel obtained by the DDA unit 101a into physical addresses of the ZBUF units 107-1 and 107-3 and the FBUF units 107-2 and 107-4 and map the texture data of the drawing pixel. MEMIF units 103a and 103b read/write Z coordinate values from/to the ZBUF units 107-1 and 107-3 and read/write drawing data from/to the FBUF units 107-2 and 107-4.

Signals lines D10, D20a, D20b, D30a, D30b, and D40 are used to send signals as with the third conventional example shown in FIG. 11. Buses B3a and B3b are used to read texture data. Buses B1a and B1b are used to read/write Z coordinate values. Buses B2a and B2b are used to read/write drawing data.

Figure 6:
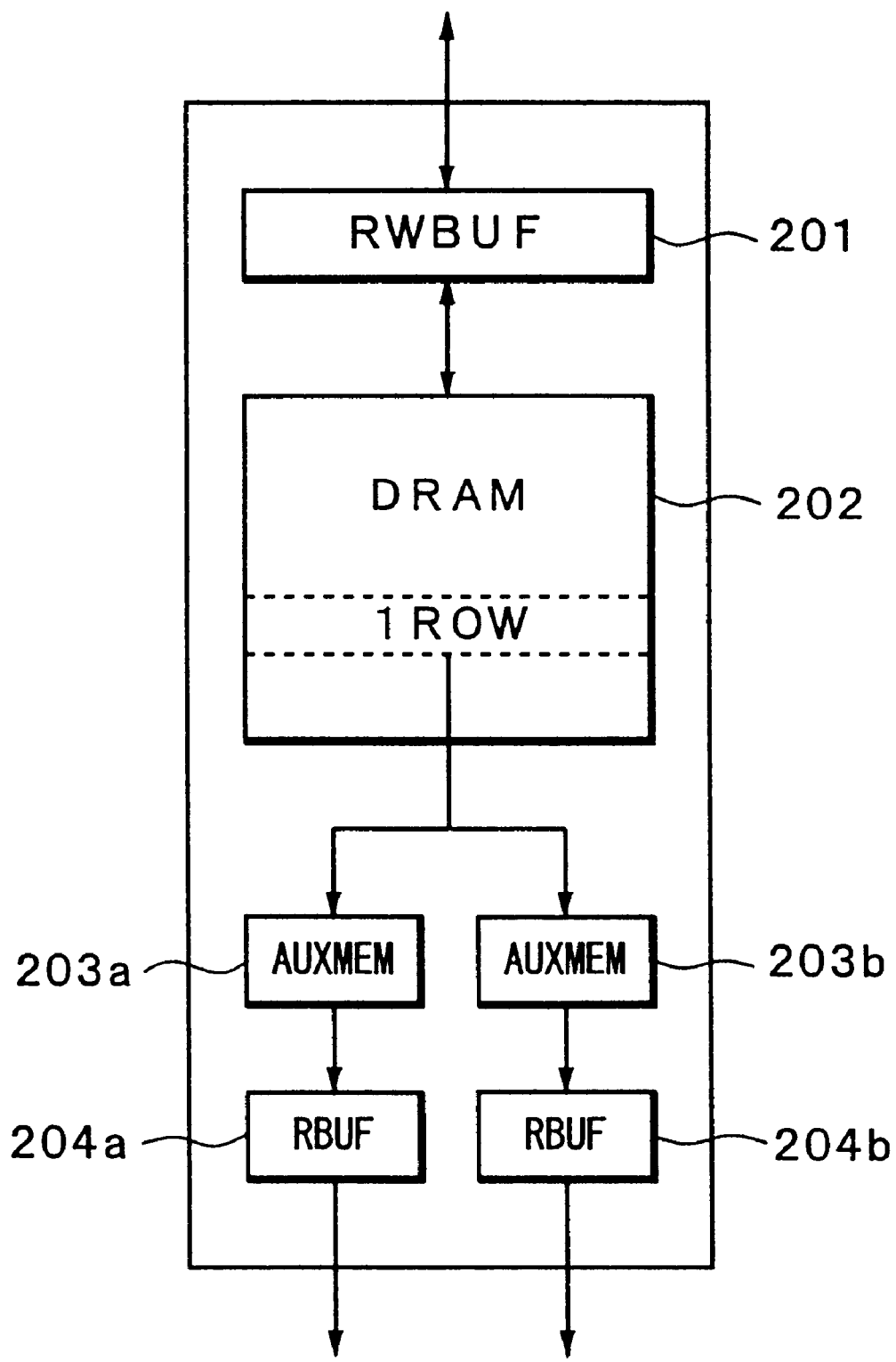
FIG. 6 is a block diagram showing the internal structure of a memory of the picture generating apparatus suitable for use with the fourth embodiment of the invention shown in FIG. 5.

Next, the operation of the picture generating apparatus according to the fourth embodiment of the present invention will be described. The operation of the fourth embodiment is the same as the operation of the third conventional apparatus shown in FIG. 11 except for the texture mapping operation. Thus, only the texture mapping operation of the fourth embodiment will be described. FIG. 6 shows the internal structure of a memory of each of the ZBUF units 107-1 and 107-3 and the FBUF units 107-2 and 107-4.

In FIG. 6, as with the first embodiment shown in FIG. 2, reference numerals 201 and 202 are a bidirectional buffer and a DRAM unit, respectively. Auxiliary memory 203a and 203b (AUXMEM units) temporarily store data of the DRAM unit 202. Read buffers 204a and 204b are also provided. The RBUF unit 204a is connected to the bus B3a. The RBUF unit 204b is connected to the bus B3b.

In the case of the ZBUF unit 107-1, the bidirectional buffer 201 is connected to the bus B1a. In the case of the ZBUF unit 107-3, the bidirectional buffer 201 is connected to the bus B1b. In the case of the FBUF unit 107-2, the bidirectional buffer 201 is connected to the bus B2a. In the case of the FBUF unit 107-4, the bidirectional buffer 201 is connected to the bus B2b.

A Z coordinate value or drawing data is read and written through the bidirectional buffer 201. Texture data is read through the buffer 204a or 204b. When desired texture data is present in the AUXMEM unit 203a of the ZBUF unit 107-1 or 107-3 or the FBUF unit 107-2 or 107-4, the TMAP unit 102a decodes a physical address calculated by the TMAP unit 102, selects desired texture data from the AUXMEM unit 203a, enables the buffer 204a of the memory that stores the desired texture data, reads the desired texture data from the buffer 204a through the bus B3a, and maps the texture data.

On the other hand, when desired texture data is not present in the AUXMEM unit 203a of each of the ZBUF units 107-1 and 107-3, and the FBUF units 107-2 and 107-4, if the memory that stores the desired texture data is connected to the MEMIF unit 103a, the TMAP unit 102a causes a signal REQaa to be active. When the memory is connected to the MEMIF unit 103b, the TMAP unit 102a causes a signal REQab to be active. In addition, the TMAP unit 102a supplies a physical address of the desired texture data through a signal line ADRa.

When the signals REQaa and REQab become active, the MEMIF units 103a and 103b activate a row of the desired texture data of the DRAM unit 202 of the ZBUF unit 107-1, the FBUF unit 107-2, the ZBUF unit 107-3, or the FBUF unit 107-4 with the physical address supplied by the TMAP unit 102a, sends data of the entire row to the AUXMEM unit 203a, and causes the signals RDYaa and RDYab to be active so as to inform that the data of the entire row has been sent.

When the signal RDYaa or RDYab becomes active, the TMAP unit 102a reads texture data in the manner that the desired texture data is present in the AUXMEM unit 203a of the ZBUF unit 107-1 or 107-3 or the FBUF unit 107-2 or 107-4 and maps the texture data. This operation applies to the operation of the TMAP unit 102b.

Figure 14A:
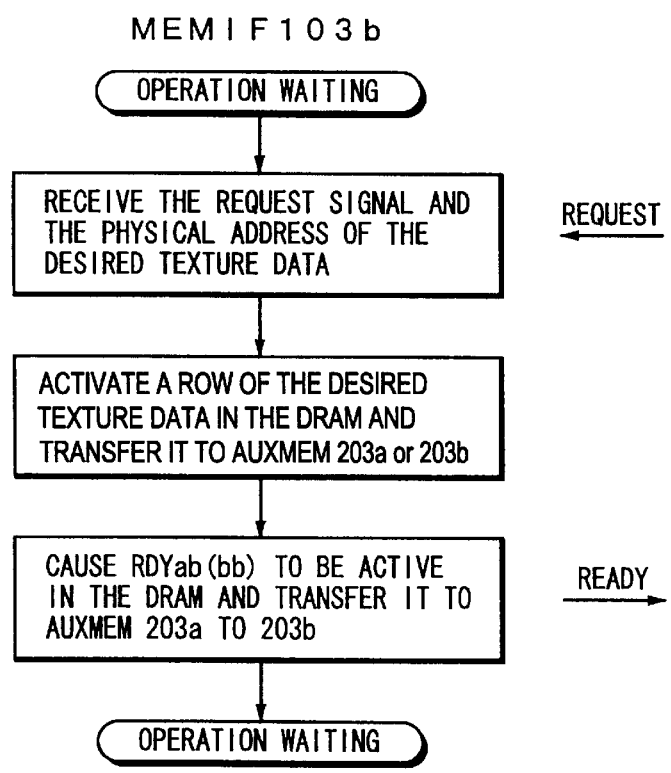
FIG. 14 is a flowchart illustrating the operation of the TMAP and MEMIF units shown in FIG. 5 using the memory structure shown in FIG. 6.
Figure 14B:
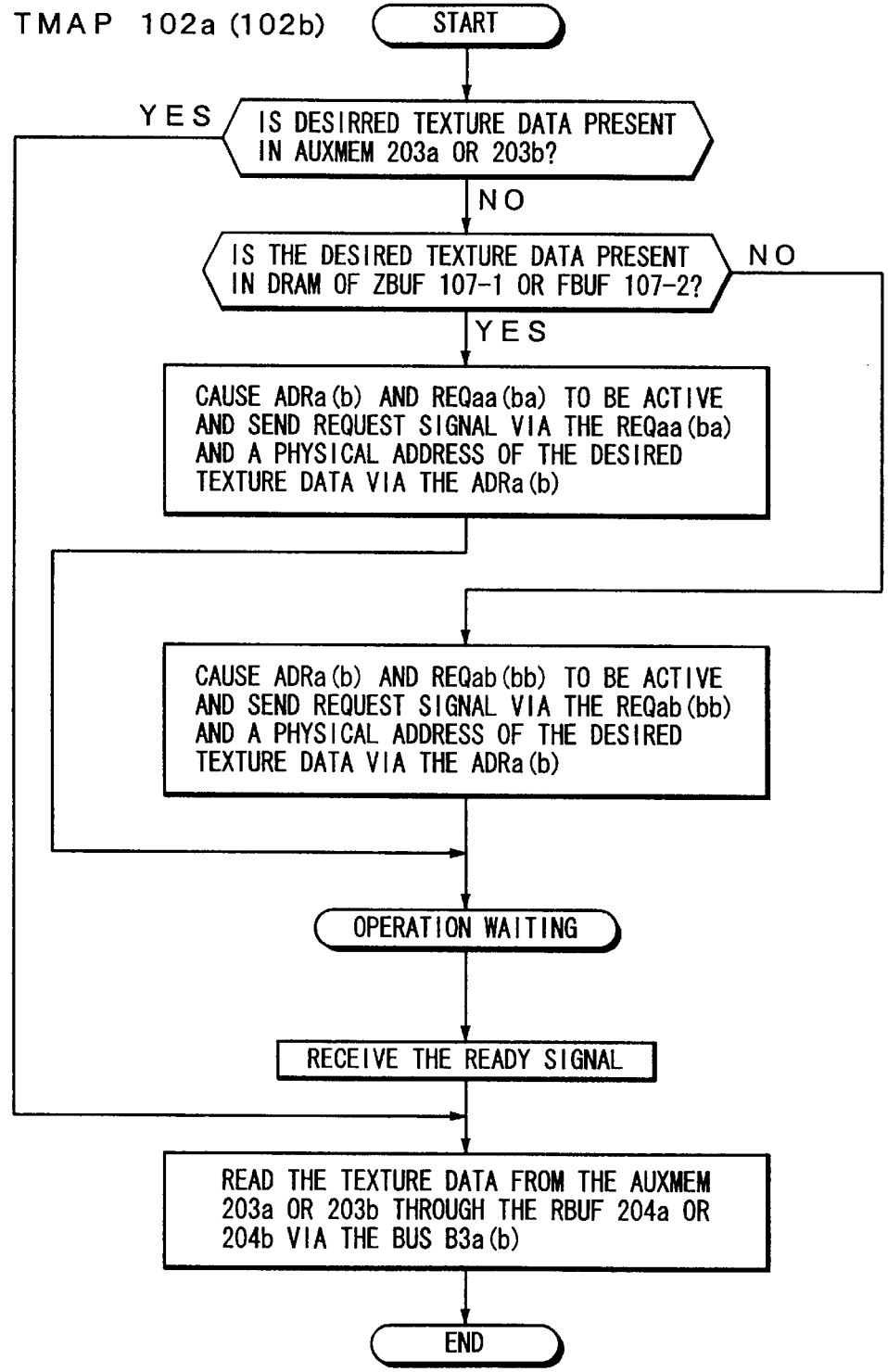
Figure 14C:
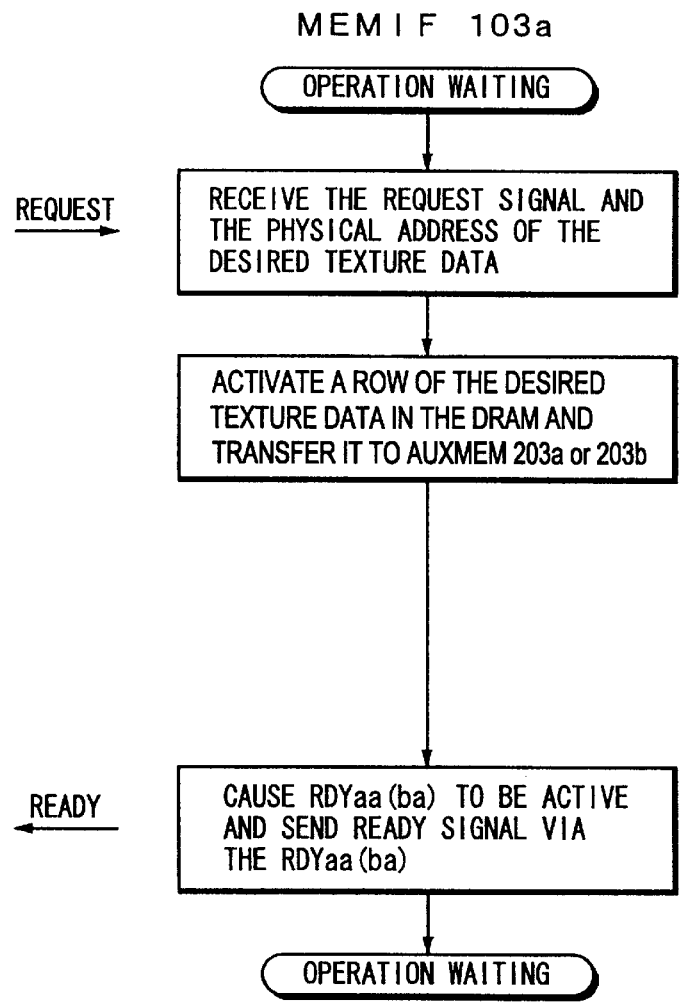

FIG. 14 is a self-explanatory flowchart describing the operation of the TMAP and MEMIF units shown in FIG. 5 using the memory structure shown in FIG. 6.

Figure 7:
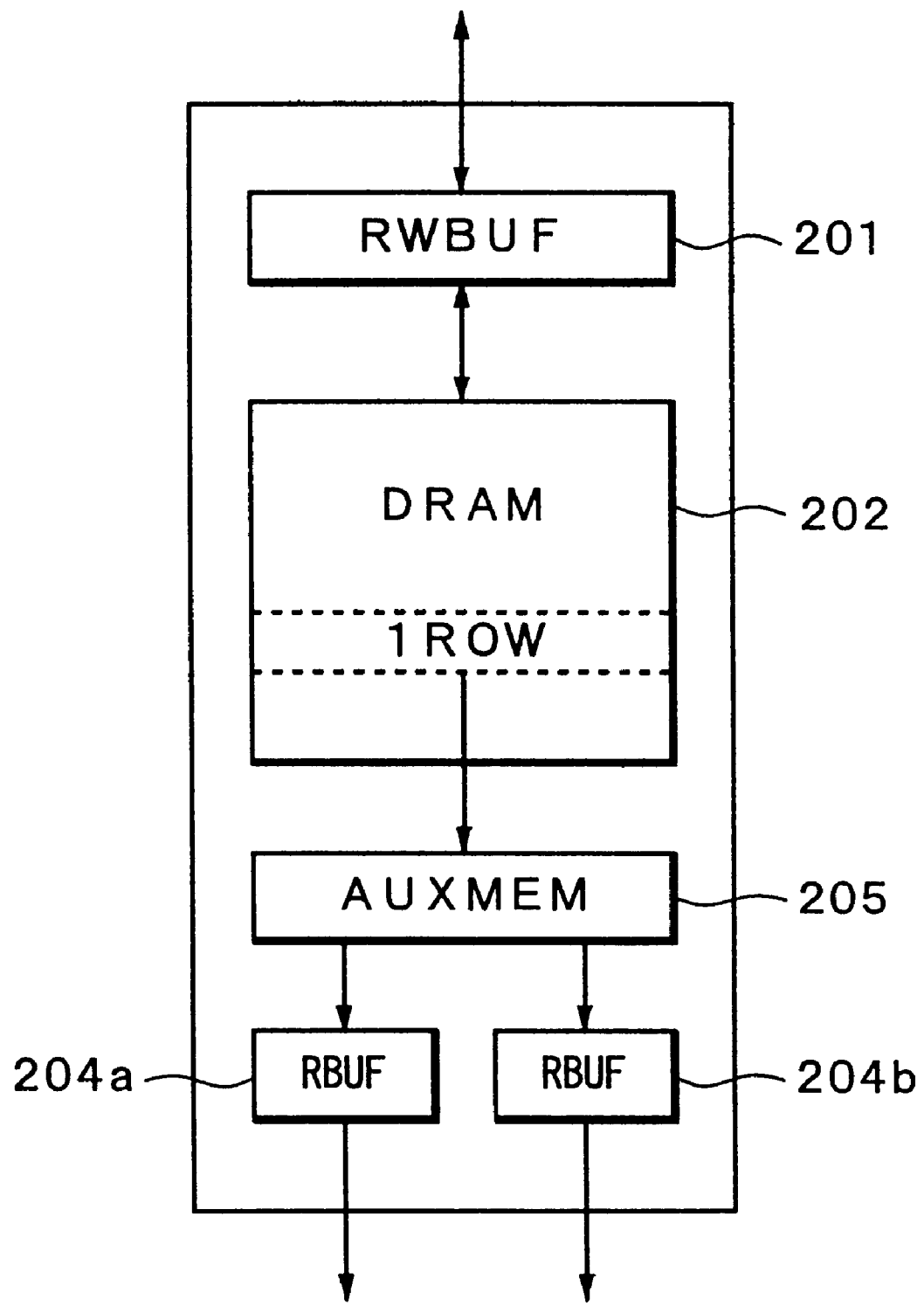
FIG. 7 is a block diagram showing another example of the internal structure of a memory of the picture generating apparatus suitable for use with the fourth embodiment of the invention shown in FIG. 5.

FIG. 7 shows another example of the internal structure of the memory in each of the ZBUF units 107-1 and 107-3 and the FBUF units 107-2 and 107-4. In FIG. 7, as with the structure shown in FIG. 6, a bidirectional buffer 201, a DRAM unit 202 and read buffers 204a, and 204b are provided. Auxiliary memory 205 (AUXMEM unit) temporarily stores part of data of the DRAM unit 202. The AUXMEM unit 205 has two read ports. The AUXMEM unit 205 can read different texture data requested by the TMAP units 102a and 102b at the same time. The operation of the memory with the internal structure shown in FIG. 7 is the same as the operation of the memory with the internal structure shown in FIG. 6.

Figure 15A:
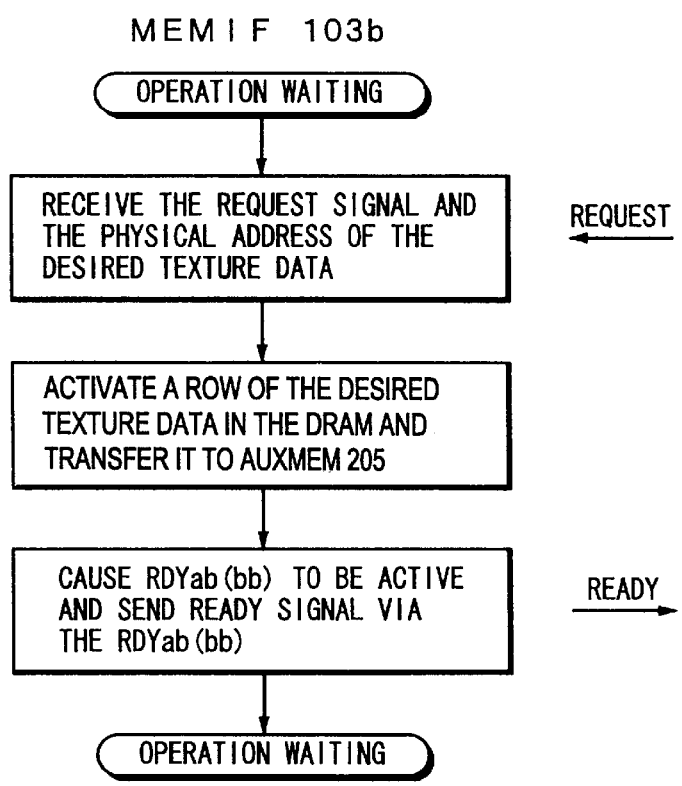
FIG. 15 is flowchart illustrating the operation of the TMAP and MEMIF units shown in FIG. 5 using the memory structure shown in FIG. 7.
Figure 15B:
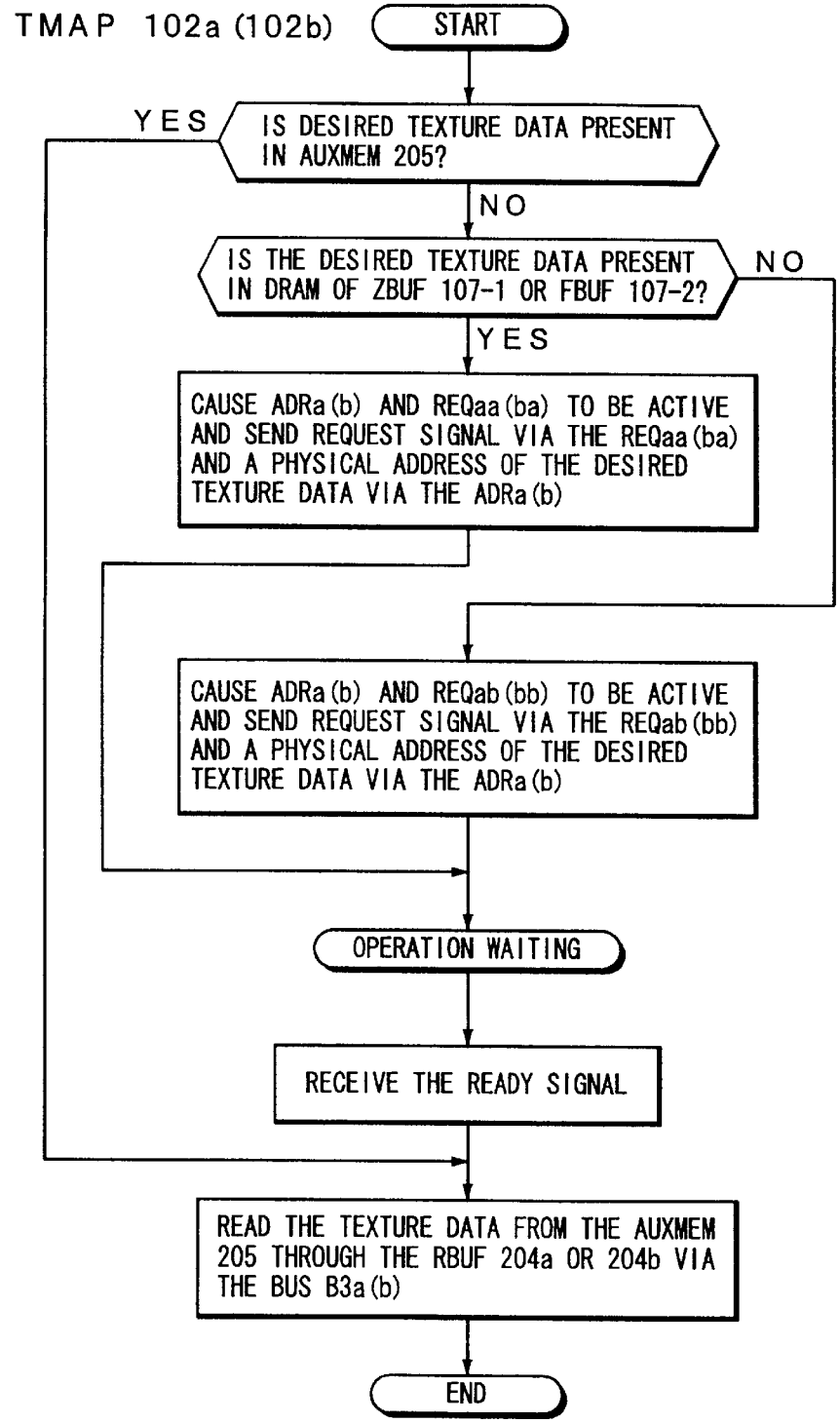
Figure 15C:
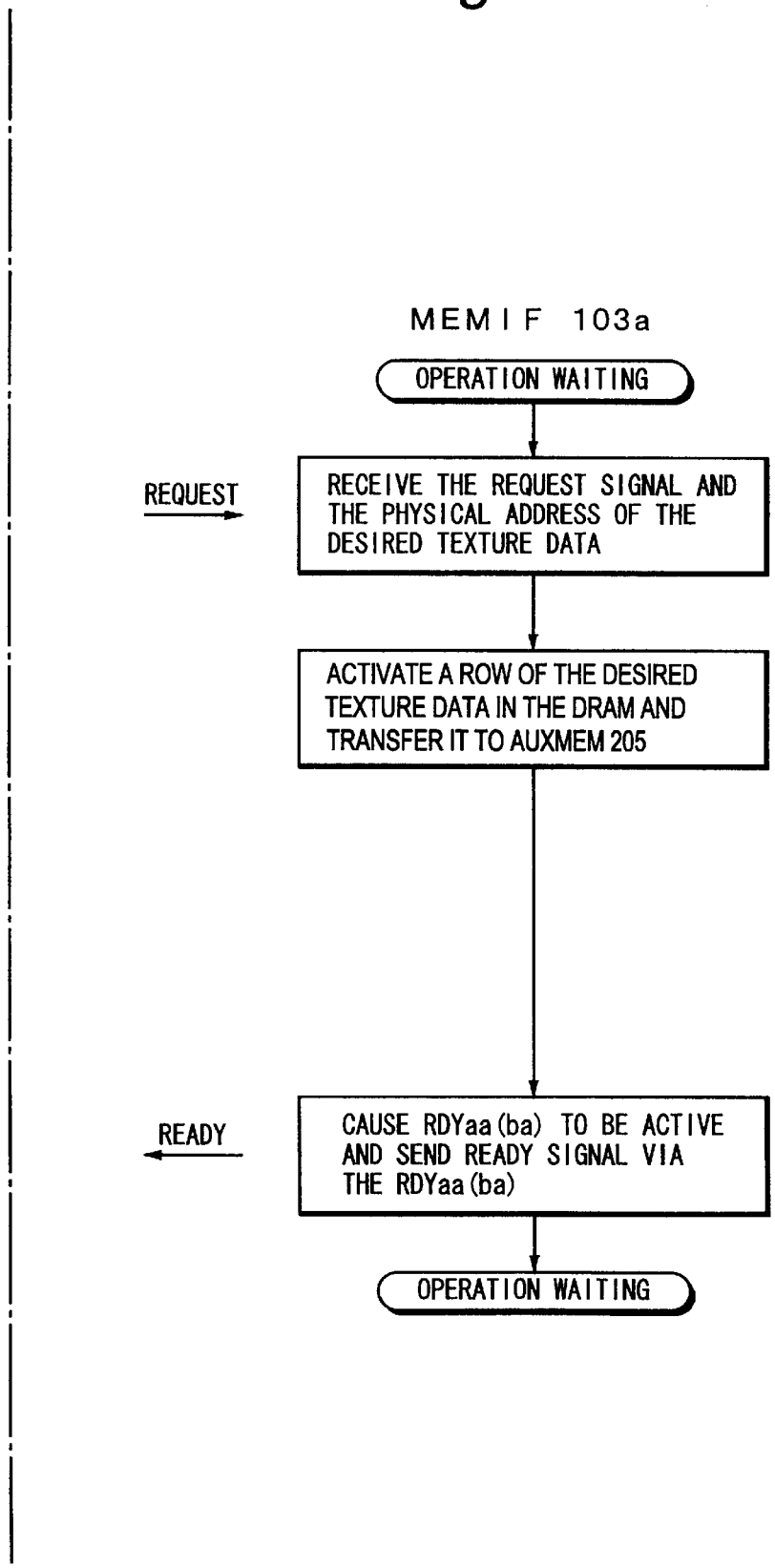

FIG. 15 is a self-explanatory flowchart describing the operation of the TMAP and MEMIF units shown in FIG. 5 using the memory structure shown in FIG. 7.

Figure 8:
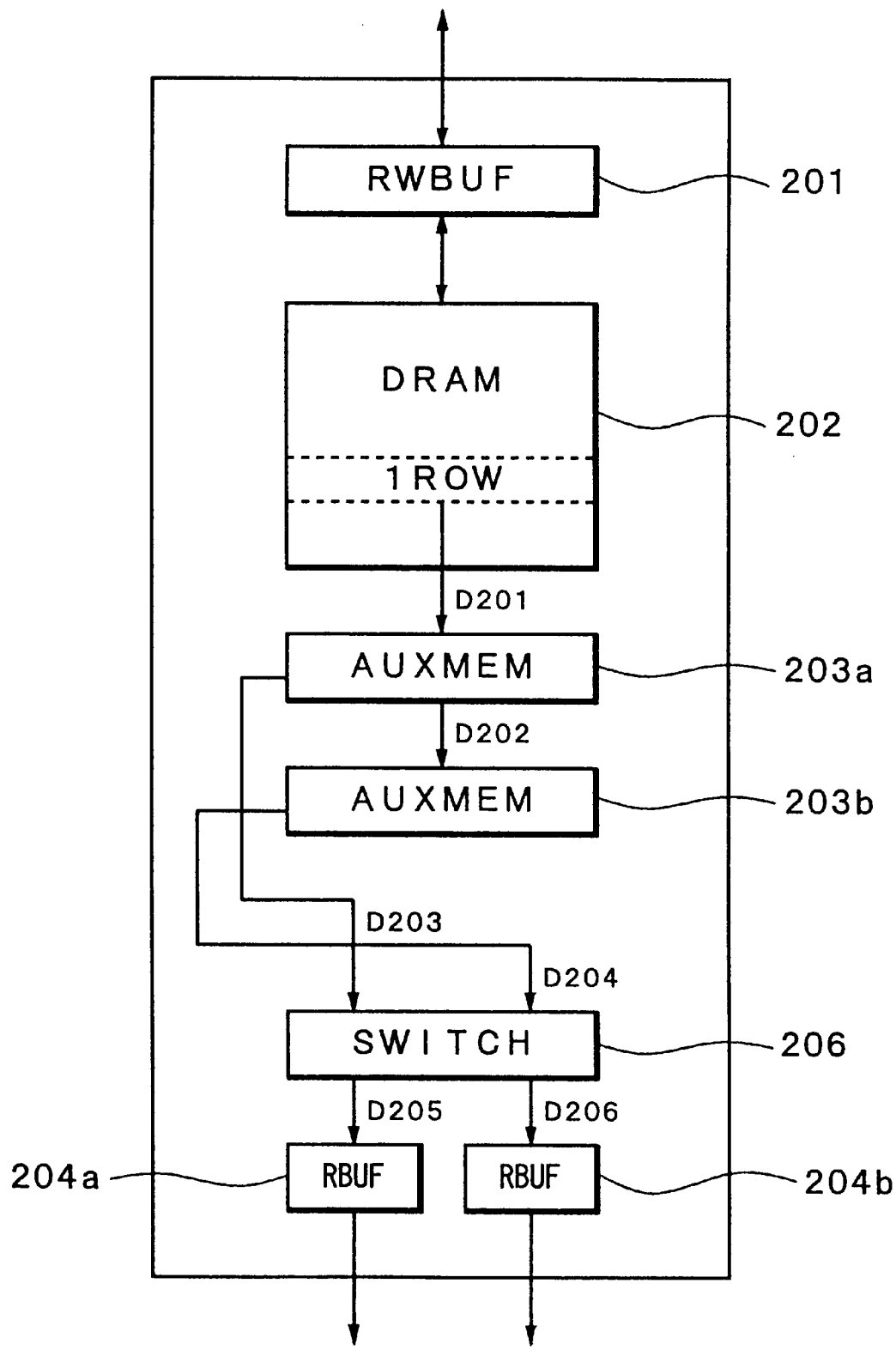
FIG. 8 is a block diagram showing a further example of the internal structure of a memory of the picture generating apparatus suitable for use with the fourth embodiment of the invention shown in FIG. 5.

FIG. 8 shows a further other example of the internal structure of the memory of each of the ZBUF units 107-1 and 107-3 and the FBUF units 107-2 and 107-4. In FIG. 8, a SWITCH unit 206 selects the connections between input signals D203 and D204 and output signals D205 and D206. A signal line D201 is used for sending data of one row of the DRAM unit 202 to the AUXMEM unit 203a. A signal line D202 is used for sending all data stored in the AUXMEM unit 203a to the AUXMEM unit 203b. A signal line D203 is for sending data selected from the AUXMEM unit 203a to the SWITCH unit 206. A signal line D204 for sending data selected from the AUXMEM unit 203b to the SWITCH unit 206. Signal lines D205 and D206 connect the output signal of the SWITCH unit 206 to the RBUF units 204a and 204b.

The other structure is the same as that shown in FIG. 6. However, in the internal structure shown in FIG. 6, the AUXMEM units 203a and 203b are connected in parallel. However, in the internal structure shown in FIG. 8, the AUXMEM units 203a and 203b are connected in series. In addition, there is no path for directly sending data from the DRAM unit 202 to the AUXMEM unit 203b. Thus, the structure of the AUXMEM unit and the connection between the DRAM unit and the AUXMEM unit become simple. Consequently, the size of the memory shown in FIG. 8 becomes smaller than that of the memory shown in FIG. 6.

Next, the operation in the case of the memory with the internal structure shown in FIG. 8 will be described. In the internal structure shown in FIG. 6, the TMAP units 102a and 102b fixedly reference the contents of the AUXMEM units 203a and 203b, respectively. However, in the case shown in FIG. 8, the TMAP units 102a and 102b do not fixedly reference such contents.

Assuming that the TMAP units 102a and 102b reference the AUXMEM units 203a and 203b, respectively, when text data that the TMAP unit 102b requires is not present in the AUXMEM unit 203b, all data stored in the AUXMEM unit 203a is sent to the AUXMEM unit 203b through the signal line D202. The row of the texture data that the TMAP unit 102b requires becomes active and the data of the entire row is sent to the AUXMEM unit 203a.

The SWITCH unit 206 connects the signal lines D203 and D204 to the signal lines D206 and D205, respectively. After the data has been sent, the TMAP unit 102b selects desired texture data from the AUXMEM unit 203a. The selected texture data is read through a path of the signal lines D203 and D206 and the bus B3b. On the other hand, assuming that the TMAP units 102a and 102b reference the AUXMEM units 203a and 203b, respectively, when texture data that the TMAP unit 102b requires is not present in the AUXMEM unit 203a, the texture data is sent from the DRAM unit 202 to the AUXMEM unit 203a. However, in this case, the texture data is not sent from the AUXMEM unit 203a to the AUXMEM unit 203b. In addition, the SWITCH unit 206 does not change connections of signal lines.

Figure 16A:
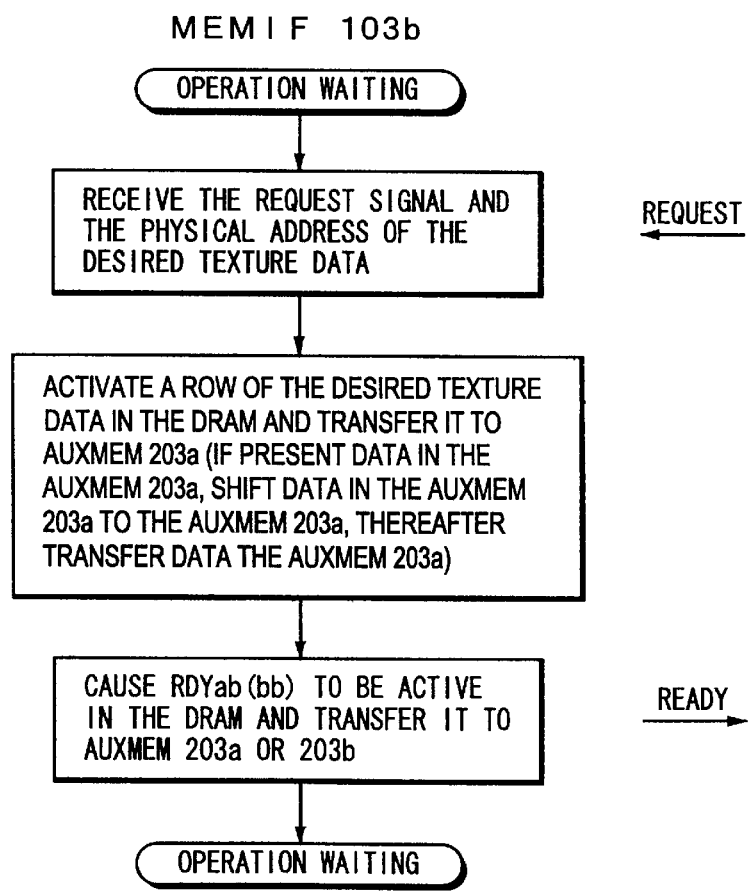
FIG. 16 is a flowchart illustrating the operation of the TMAP and MEMIF units shown in FIG. 5 using the memory structure shown in FIG. 8.
Figure 16B:
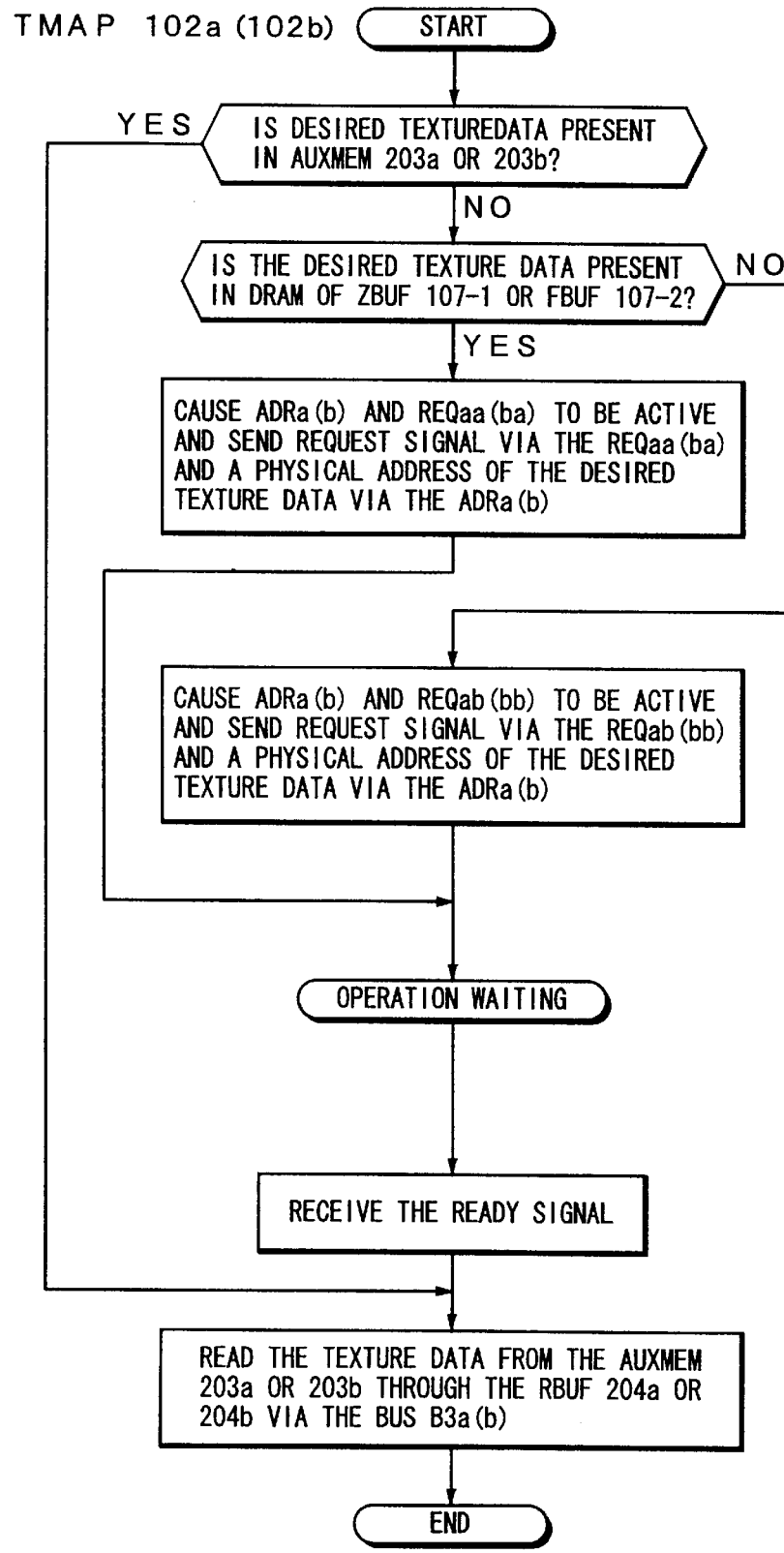
Figure 16C:
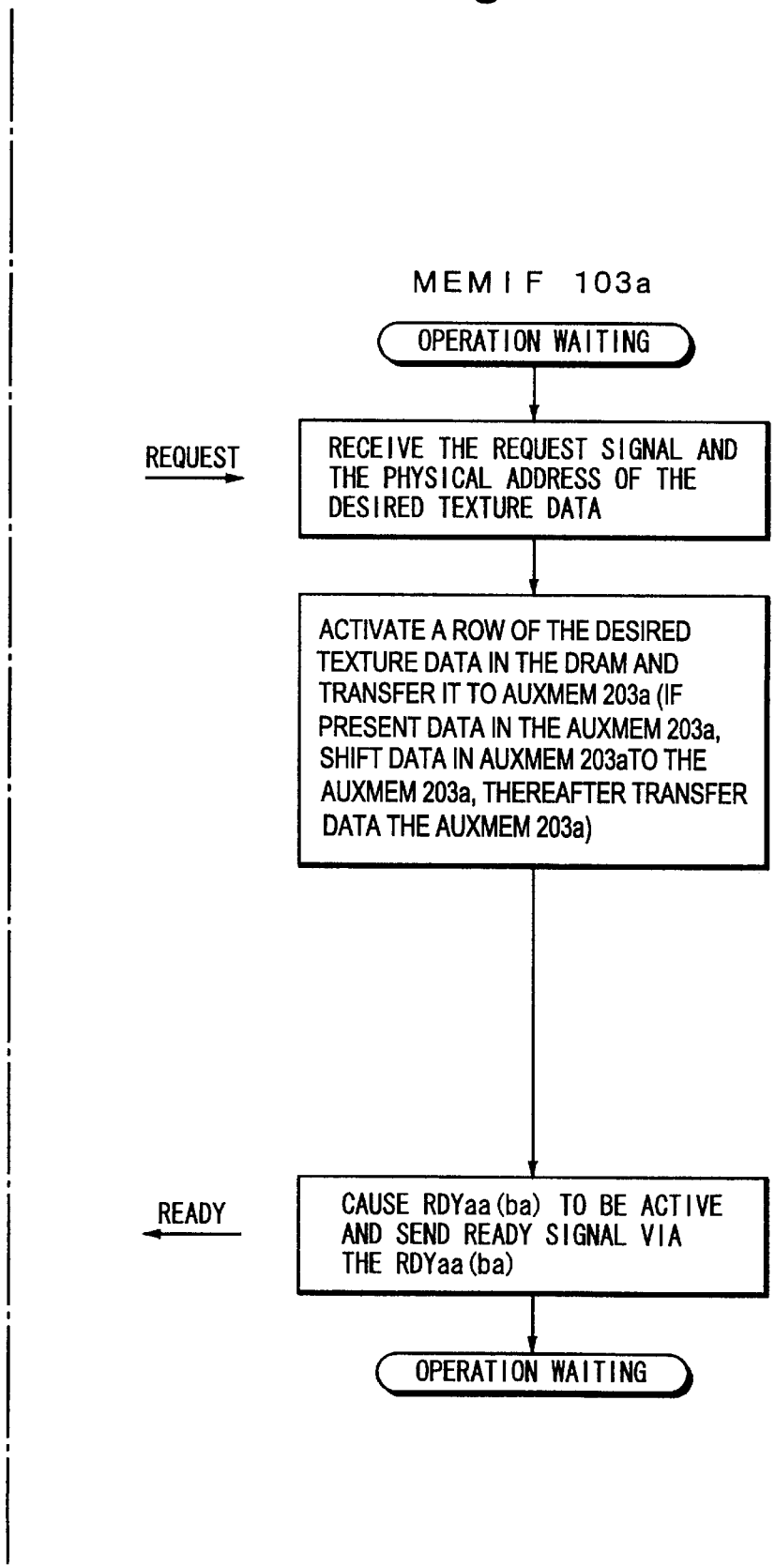

FIG. 16 is a self-explanatory flowchart describing the operation of the TMAP and MEMIF units shown in FIG. 5 using the memory structure shown in FIG. 8.

As described above, according to the fourth embodiment of the present invention, each of a memory (ZBUF unit) for a Z coordinate value used for removing a hidden surface and a memory (FBUF unit) for drawing data that is output to the display unit has a DRAM unit and an auxiliary memory. A plurality of auxiliary memory are disposed corresponding to the parallel processing ratio. Alternatively, the auxiliary memory may have a plurality of read ports. According to the fourth embodiment of the present invention, the plurality of TMAP units can read texture data at the same time. The texture data is flexibly stored in free areas of both the memories. Thus, it is not necessary to redundantly store the same texture data. Consequently, texture data can be mapped at high speed with a relatively inexpensive structure.

According to the third embodiment shown in FIG. 4, a bus for reading/writing a Z coordinate value, a bus for reading/writing drawing data, and a bus/memory for loading picture data are fixedly connected. However, according to the second embodiment shown in FIG. 3, with a bidirectional buffer, connections of a bus and a memory can be freely varied. Thus, the flexibility of the apparatus can be improved. Moreover, in the third embodiment shown in FIG. 4, as with the second embodiment shown in FIG. 3, when each memory is structured with a plurality of banks and the memory interleaving method is used, data can be drawn at higher speed than the other structures.

According to the fourth embodiment shown in FIG. 5, the bus for reading/writing a Z coordinate value and the bus/memory for reading/writing drawing data are fixedly connected. However, as with the second embodiment shown in FIG. 3, when the connections of the buses and memories are freely varies with bidirectional buffers, the flexibility can be further improved. In the fourth embodiment shown in FIG. 5, as with the second embodiment shown in FIG. 3, when each memory is structured with a plurality of banks and the memory interleaving method is used, picture can be drawn at higher speed.

In the fourth embodiment shown in FIG. 5, as with the third embodiment shown in FIG. 4, when a picture inputting means is disposed, the decrease of the performance due to changes of texture data can be minimized. In addition, texture data of moving picture data can be mapped.

As described above, the apparatus according to the present invention comprises a memory for drawing data that is output to a display unit or for a Z coordinate value used for removing a hidden surface and a coordinate converting means for calculating a physical address of texture data with texture coordinates corresponding to a drawing pixel. The memory has a DRAM unit and an auxiliary memory. Data of part or all one row of the DRAM unit is sent to the auxiliary memory at a time. Thus, the penalty in the case that desired texture data is not present in the auxiliary memory becomes small. With the structure of which the memory has a dedicated read port and which drawing data and a Z coordinate value are read or written and texture data is read at the same time, texture data can be flexibly stored in free areas of both the memories. In addition, texture data can be mapped at high speed.

When a plurality of coordinate converting means are disposed for processing texture data in parallel, a plurality of auxiliary memory are disposed corresponding to the parallel processing ratio. Alternatively, when the auxiliary memory has a plurality of read ports, the plurality of coordinate converting means can read texture data at a time. Thus, it is not necessary to redundantly store the same texture data. Consequently, texture data can be mapped at high speed with a relatively inexpensive structure.

With the structure of which a picture inputting means is disposed and which drawing data and Z coordinate value are read or written, texture data is read, and texture data and moving picture data are loaded at the same time, even if an application uses many textures that exceed the storage capacity of a local memory, the decrease of the performance due to changes of texture data can be minimized. In addition, texture data of moving picture data can be mapped.

Hence, the present invention satisfies a long existing need for enhanced image data processing for picture generation which can flexibly map texture data at increased speed and lower cost.

It will be apparent from the foregoing that, while particular forms of the invention have been illustrated and described, various modifications can be made without departing from the spirit and scope of the invention. Accordingly, it is not intended that the invention be limited, except as by the appended claims.

We claim:

1. In a picture generating system, the combination comprising:

a display;

a memory subsystem for storing picture generation data, said memory subsystem having an addressable main memory and an addressable auxiliary memory, said main memory storing picture generation data, said auxiliary memory responsive to said main memory for receiving picture generation data therefrom and for temporarily storing said received picture generation data;

a read/write port for accessing said main memory;

a dedicated read only port for accessing said auxiliary memory;

means for reading/writing certain selected portions of said picture generation data through said read/write port;

means for reading other selected portions of said picture generation data through said dedicated read only port when said other selected portions of said picture generation data are present in said auxiliary memory;

means for transferring said other selected portions of said picture generation data from said main memory to said auxiliary memory when said other selected portions of said picture generation data are not present in said auxiliary memory; and means for processing said certain selected portions of said picture generation data and said other selected portions of said picture generation data to generate picture data for forwarding to said display;

wherein said reading/writing means, reading means and transferring means operate in parallel;

wherein said certain selected portions of said picture generation data and said other selected portions of said picture generation data are mutually exclusive.

2. A combination as set forth in claim 1, wherein said other selected portions of said picture generation data includes only texture data.

3. A combination as set forth in claim 1, wherein said certain selected portions of said picture generation data includes data other than texture data.

4. A combination as set forth in claim 1, wherein said certain selected portions of said picture generation data includes drawing data for pixels to be displayed and Z coordinate values for removing hidden surfaces.

5. An apparatus for generating picture data for a plurality of drawing pixels, comprising:

a memory system having an addressable main memory accessible through a read/write port and an addressable auxiliary memory accessible through a dedicated read port, said main memory coexistently storing texture data, drawing data that is output to a display unit and Z coordinate values used for removing hidden surfaces, said auxiliary memory responsive to said main memory for receiving data therefrom and for temporarily storing said received data; and coordinate converting means for calculating a physical address of texture data with texture coordinates corresponding to each drawing pixel and for reading texture data corresponding to each drawing pixel from said auxiliary memory through said dedicated read port when desired texture data is present in said auxiliary memory, and transferring data of all or part of the desired texture data to said auxiliary memory when desired texture data is not present in said auxiliary memory so that said converting means can thereafter read texture data corresponding to the drawing pixel from said auxiliary memory;

means for reading/writing the drawing data and the Z coordinate value exclusively through said read/write port;

wherein the transfer of the desired texture data to said auxiliary memory occurs in parallel with the reading or writing of the drawing data and the Z coordinate data through said read/write port.

6. An apparatus as set forth in claim 5, wherein said main memory is accessed by a row address and a column address and said auxiliary memory is accessed by a column address.

7. An apparatus as set forth in either of claims 1 or 5, wherein said main memory includes a dynamic random access memory.

8. An apparatus as set forth in either of claim 1 or 5, and further comprising:

means for receiving texture data that is not frequently used and should be frequently changed and for transmitting such data to said main memory.

9. An apparatus as set forth in either of claims 1 or 5, and further comprising:

means for receiving moving video data and for transmitting said moving video data to said memory.

10. An apparatus as set forth in any of claims 1–5, wherein said means for reading/writing comprises:

image inputting means for loading texture data through said read/write port of said main memory.

11. An apparatus as set forth in claim 5, wherein:

said main memory includes a dynamic random access memory accessed with a row address and a column address; and said coordinate converting means writes data of all or part of a row of texture data to said auxiliary memory when the desired texture data is not present in said auxiliary memory.

12. For a picture generating device having a display unit and a memory subsystem having an addressable main memory accessible through a read/write port and an addressable auxiliary memory accessible through a dedicated read port, said auxiliary memory responsive to said main memory for receiving data therefrom and for temporarily storing said received data, a picture generating method comprising the steps of:

coexistently storing texture data along with drawing data that is output to the display unit to said main memory;

coexistently storing texture data along with Z coordinate values used for removing a hidden surface to said main memory;

temporarily storing part of said texture data in said auxiliary memory;

reading or writing drawing data or a Z coordinate value exclusively through said read/write port;

calculating a physical address of texture data with texture coordinates corresponding to each drawing pixel;

when desired texture data is present in said auxiliary memory, reading texture data corresponding to the drawing pixel from said auxiliary memory through said dedicated read port; and when desired texture data is not present in said auxiliary memory, transferring all or part of the desired texture data to said auxiliary memory and thereafter reading texture data corresponding to the drawing pixel from said auxiliary memory;

wherein the transferring of the desired texture data to the auxiliary memory occurs in parallel with the reading or writing of the drawing data and the Z coordinate data through the read/write port.

13. In a picture generating system, the combination comprising:

a memory subsystem for storing picture generation data which includes texture data, said memory subsystem including an addressable main memory and a plurality of addressable auxiliary memories, each of said auxiliary memories responsive to said main memory for receiving picture generation data therefrom and for temporarily storing said received picture generation data;

a read/write port for accessing said main memory;

for each of said auxiliary memories, a dedicated read only port for accessing said auxiliary memory;

means for reading/writing certain selected portions of said picture generation data through said read/write port;

means for reading other selected portions of said picture generation data through at least one of said dedicated read only ports when said other selected portions of said picture generation data are present in one of said auxiliary memories;

means for transferring said other selected portions of said picture generation data from said main memory to at least one of said auxiliary memories when said other selected portions of said picture generation data are not present in at least one of said auxiliary memories; and wherein said reading/writing means, reading means and transferring means operate in parallel and texture data is read in parallel from said plurality of auxiliary memories.

14. A picture generating apparatus, comprising:

a direct differential analyzer for linearly interpolating picture data for a plurality of drawing pixels, including texture data, drawing data and Z coordinate values for removing hidden surfaces;

a memory subsystem for storing said data, said memory subsystem including a drawing data memory unit and a Z coordinate memory unit, said drawing data memory unit having an addressable main memory for storing drawing data and an addressable auxiliary memory, said Z coordinate memory unit having an addressable memory for storing Z coordinate values and an addressable auxiliary memory, said texture data being stored in available free areas of both of said main memories, said auxiliary memories responsive to said main memories for receiving texture data therefrom and for temporarily storing said received texture data;

a texture mapping unit for converting texture data coordinates of each drawing pixel to a physical address in one of said memory units;

a memory interface means for directing texture data through said analyzer and said texture mapping unit to said memory subsystem;

for each of said main memories, a read/write port;

for each of said auxiliary memories, a dedicated read only port; and means for reading/writing certain selected portions of said data exclusively through said read/write ports;

means for reading other selected portions of said picture generation data exclusively through at least one of said dedicated read only ports when said other selected portions of said picture generation data are present in at least one of said auxiliary memories; and means for transferring said other selected portions of said picture generation data from one of said main memories to one of said auxiliary memories when said other selected portions of said picture generation data are not present in one of said auxiliary memories;

wherein said reading/writing means, reading means and transferring means operate in parallel.

15. An apparatus as set forth in claim 14, wherein said other selected portions of said picture generation data includes only texture data.

16. An apparatus as set forth in claim 14, wherein said certain selected portions of said picture generation data includes data other than texture data.

17. The combination as set forth in claim 13 wherein said other selected portions of said picture generation data includes only texture data.

18. The combination as set forth in claim 13 wherein said certain selected portions of said picture generation data includes data other than texture data.

19. The combination as set forth in claim 13 wherein said certain selected portions of said picture generation data includes drawing data for pixels to be displayed and Z coordinate values for removing hidden surfaces.

20. An apparatus for generating picture data for a plurality of drawing pixels, comprising:

a memory system having an addressable main memory accessible through a read/write port and a plurality of addressable auxiliary memories each accessible through a dedicated read port, said main memory coexsistently storing texture data and drawing data that is output to a display unit and Z coordinate values used for removing hidden surfaces; and coordinate converting means for calculating a physical address of texture data with texture coordinates corresponding to each drawing pixel and for reading texture data corresponding to the drawing pixel from one of said auxiliary memories through at least one of said dedicated read ports when desired texture data is present in one of said auxiliary memories, and transferring data of all or part of the desired texture data to at least one of said auxiliary memories when desired texture data is not present in one of said auxiliary memories so that said converting means can thereafter read texture data corresponding to the drawing pixel from one of said auxiliary memories;

means for reading/writing the drawing data and the Z coordinate value through the read/write port;

wherein the transfer of the desired texture data to at least one of said auxiliary memories occurs in parallel with the reading or writing of the drawing data and the Z coordinate data through the read/write port.

21. The apparatus as set forth in claim 20 wherein said main memory is accessed by a row address and a column address.

22. The apparatus as set forth in claim 5 wherein said auxiliary memory has a plurality of dedicated read ports.

23. In a picture generating system, the combination comprising:

a memory subsystem for storing picture generation data, said memory subsystem including an addressable main memory and a plurality of addressable auxiliary memories connected in series, one of said auxiliary memories responsive to said main memory for receiving picture generation data therefrom;

a read/write port for accessing said main memory;

a plurality of read only ports for accessing said auxiliary memories;

a switch for selectively coupling one of said read only ports to one of said auxiliary memories;

means for reading/writing certain selected portions of said picture generation data through said read/write port;

means for reading other selected portions of said picture generation data through one of said dedicated read only ports when said other selected portions of said picture generation data are present in one of said auxiliary memories; and means for transferring said other selected portions of said picture generation data from said main memory to at least one of said auxiliary memories when said other selected portions of said picture generation data are not present in at least one of said auxiliary memories;

wherein said reading/writing means, reading means and transferring means operate in parallel.

24. The combination as set forth in claim 23 wherein said other selected portions of said picture generation data includes only texture data.

25. The combination as set forth in claim 23 wherein said certain selected portions of said picture generation data includes data other than texture data.

26. The combination as set forth in claim 23 wherein said certain selected portions of said picture generation data includes drawing data for pixels to be displayed and Z coordinate values for removing hidden surfaces.

27. An apparatus for generating picture data, comprising:

a memory system having an addressable main memory accessible through a read/write port and a plurality of addressable auxiliary memories each accessible through a read-only port, said auxiliary memories connected in series, one of said auxiliary memories responsive to said main memory for receiving picture generation data therefrom, said main memory coexsistently storing texture data and drawing data that is output to a display unit and Z coordinate values used for removing hidden surfaces; and coordinate converting means for calculating a physical address of texture data with texture coordinates corresponding to each drawing pixel and for reading texture data corresponding to the drawing pixel from one of said auxiliary memories through one of said dedicated read ports when desired texture data is present in one of said auxiliary memory; and transferring data of all or part of the desired texture data to said auxiliary memory responsive to said main memory when desired texture data is not present in said one of said auxiliary memories so that said converting means can thereafter read texture data corresponding to the drawing pixel from one of said auxiliary memories;

means for reading/writing the drawing data and the Z coordinate value through said read/write port;

wherein the transfer of the desired texture data to the auxiliary memory occurs in parallel with the reading or writing of the drawing data and the Z coordinate data through the read/write port.

28. The apparatus as set forth in claim 27 wherein said main memory is accessed by a row address and a column address.

* * * * *